(12) United States Patent
Setina et al.

(10) Patent No.: US 11,485,424 B2
(45) Date of Patent: Nov. 1, 2022

(54) SUSPENDED MOUNTING ANCHOR

(71) Applicant: J. R. Setina Manufacturing Co., Olympia, WA (US)

(72) Inventors: Terry L. Setina, Olympia, WA (US); Adam Sampson, Tenino, WA (US)

(73) Assignee: J.R. Selina Manufacturing Co., Olympia, WA (US)

( * ) Notice: Subject to any disclaimer, the term of this patent is extended or adjusted under 35 U.S.C. 154(b) by 2 days.

(21) Appl. No.: 17/242,048

(22) Filed: Apr. 27, 2021

(65) Prior Publication Data

US 2021/0331748 A1    Oct. 28, 2021

Related U.S. Application Data

(60) Provisional application No. 63/016,673, filed on Apr. 28, 2020.

(51) Int. Cl.
*B62D 27/02* (2006.01)
*B60R 21/12* (2006.01)
*B62D 27/06* (2006.01)

(52) U.S. Cl.
CPC .............. *B62D 27/02* (2013.01); *B60R 21/12* (2013.01); *B62D 27/065* (2013.01)

(58) Field of Classification Search
CPC .... B62D 21/12; B62D 21/026; B62D 21/055; B62D 7/14; B62D 27/06; B62D 27/065
USPC ............................................. 296/24.4, 24.42
See application file for complete search history.

(56) References Cited

U.S. PATENT DOCUMENTS

| 7,195,297 B2 | 3/2007 | Murray et al. |
| 8,651,351 B2 | 2/2014 | Fowler et al. |
| 8,708,388 B2 | 4/2014 | Setina |

FOREIGN PATENT DOCUMENTS

| JP | 4171143 B2 * | 10/2008 | |
| WO | WO-2014119504 A1 * | 8/2014 | ......... B25J 15/0052 |

* cited by examiner

*Primary Examiner* — Dennis H Pedder
(74) *Attorney, Agent, or Firm* — Klarquist Sparkman, LLP

(57) ABSTRACT

A suspended mounting anchor can include an anchor body configured to be disposed on a first surface of a B-pillar and a clamp member configured to be disposed on a second, opposing surface of the B-pillar. The anchor body can include one or more bosses extending from a surface of the anchor, each boss having an inner bore including a threaded portion. The clamp member can be coupled to the anchor body such that a wall of the B-pillar is disposed between the anchor body and the clamp member.

12 Claims, 20 Drawing Sheets

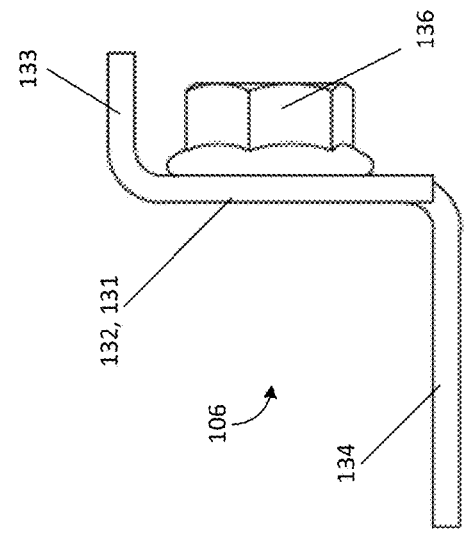
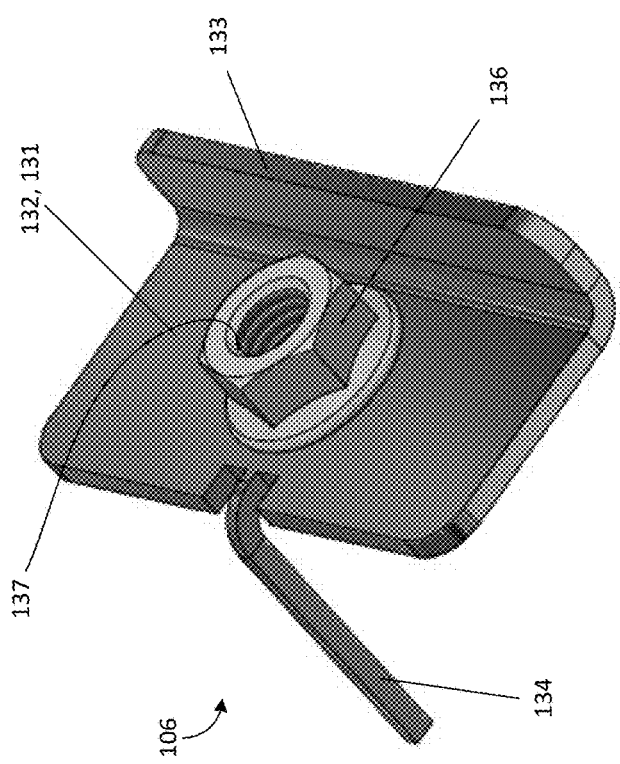
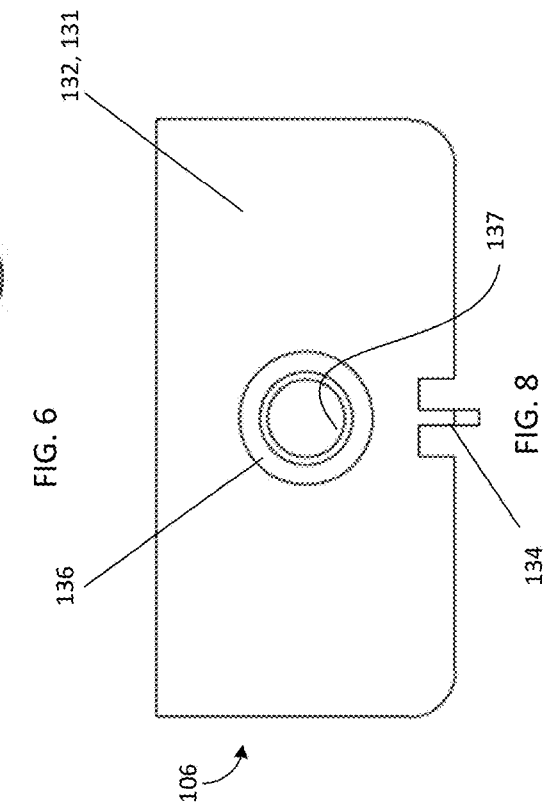

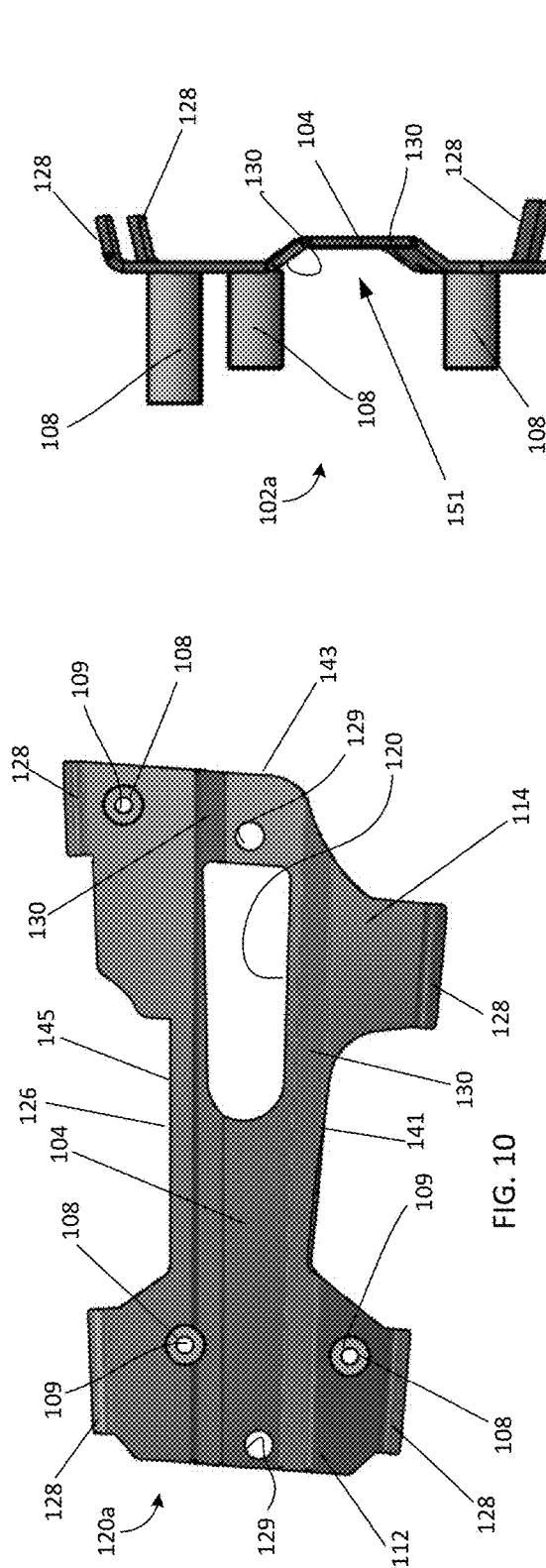
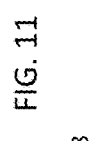
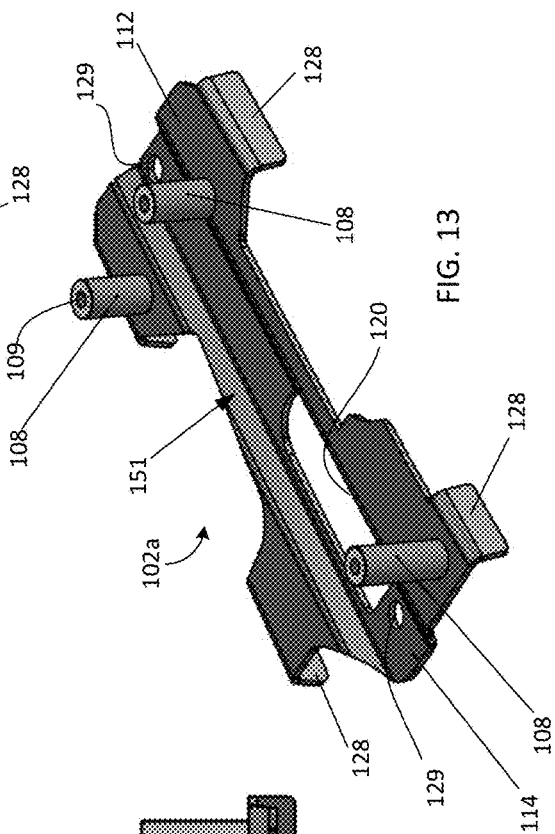
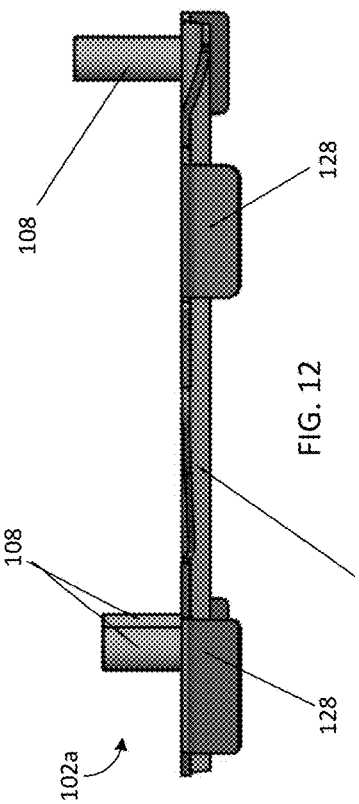

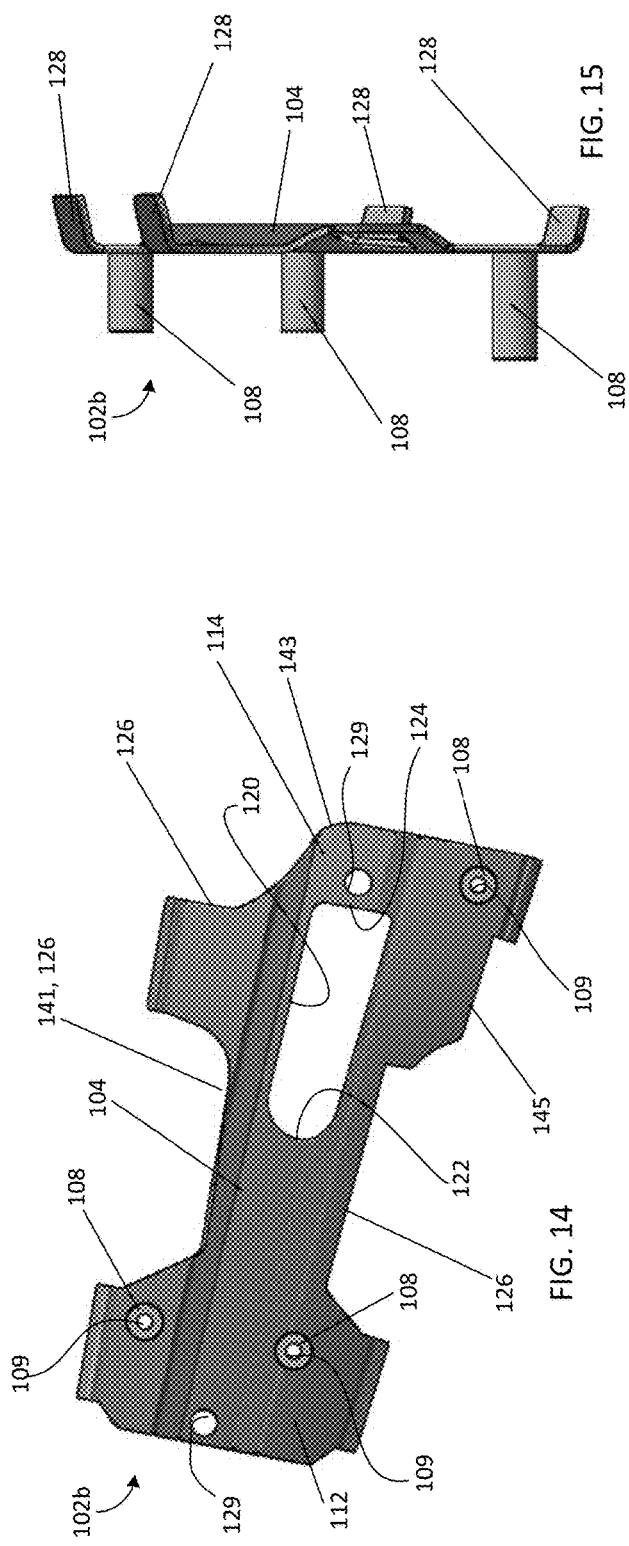
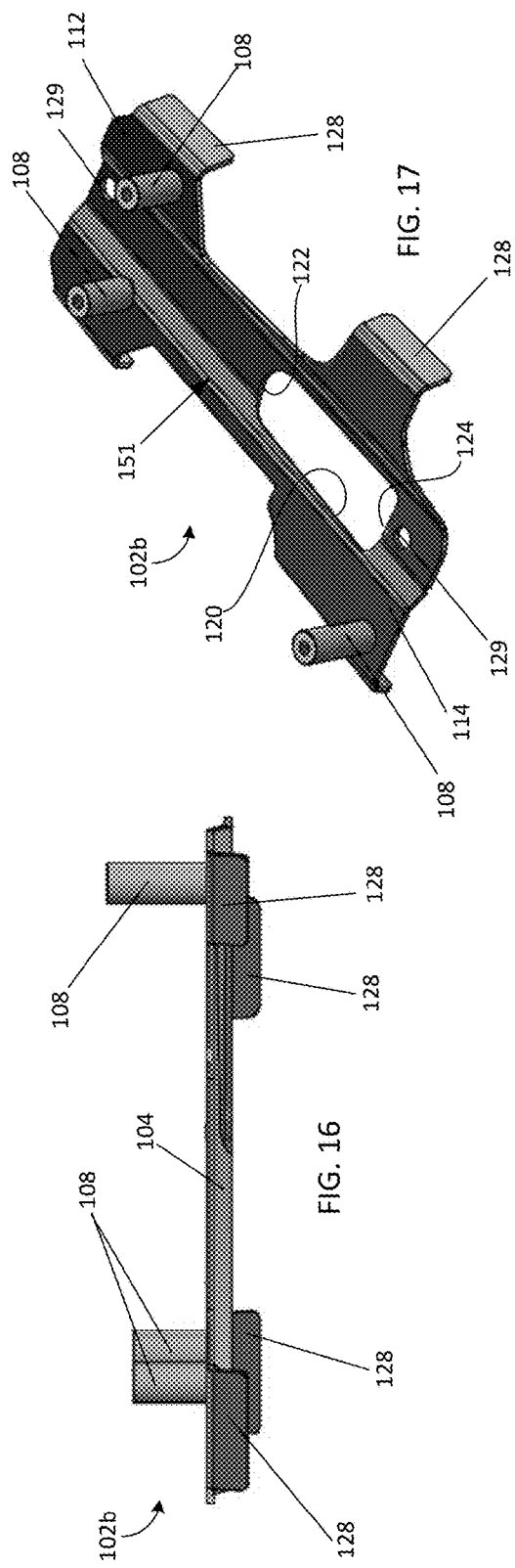
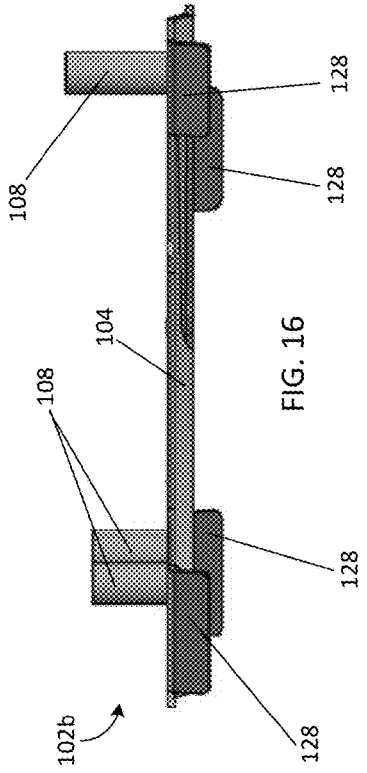

SUSPENDED MOUNTING ANCHOR

CROSS REFERENCE TO RELATED APPLICATION

This application claims the benefit of U.S. Provisional Application No. 63/016,673, entitled SUSPENDED MOUNTING ANCHOR, filed on Apr. 28, 2020, which is incorporated by reference herein.

BACKGROUND

Partitions for passenger vehicles typically are used to separate the interior space of a vehicle into separated areas for different uses. According to one common type of partition used in law enforcement vehicles, the rear occupant area (typically suited for two passengers) is separated from the front occupant area (typically suited for a driver and a passenger) by a partition. This type of partition separates one or two law enforcement officers seated in the front seat area from one, two or sometimes three rear seat occupants, such as suspects, prisoners, and other individuals, thereby reducing the risks of injury to the law enforcement officers from the rear seat occupants, as well as restricting the ability of the rear seat occupants to escape from the vehicle.

Such partitions can be mounted to the existing frame of the vehicle using one or more mounting anchors. Existing mounting anchors typically require drilling into the frame of the vehicle, which can result in longer and more costly installation times, as well as potentially compromising the integrity of the vehicle and/or partition if done incorrectly. Some conventional mounting approaches require attachments to the floor of the vehicle (posing obstructions to occupants) and/or the ceiling of the vehicle (detracting from its appearance if the partition is later removed). Accordingly, a need exists for improved anchors for mounting partitions to vehicles.

BRIEF DESCRIPTION OF THE DRAWINGS

FIGS. 6-9 illustrate various views of a bracket of the mounting assembly of FIG. 1.

FIGS. 10-13 illustrate various views of the driver side suspended mounting anchor of the mounting assembly of FIG. 1.

FIGS. 14-17 illustrate various views of the passenger side suspended mounting anchor of the mounting assembly of FIG. 1.

DETAILED DESCRIPTION

Described herein are embodiments of a suspended mounting assembly comprising one or more suspended mounting anchors for use mounting a partition to a vehicle. Though some of the below embodiments are described with respect to vehicles having a particular combination of features, the described anchors can be used with any type of vehicle.

The described anchors can be used in combination with one or more partition assemblies, such as partitions that separate the front occupant area from the rear occupant area and/or partitions that separate a portion of the rear occupant area from another portion of the rear occupant area. Additional details of such partitions can be found, for example, in U.S. Pat. No. 8,708,388 and U.S. patent application Ser. No. 17/143,917, both of which are incorporated by reference herein in their entirety.

Figure 1:
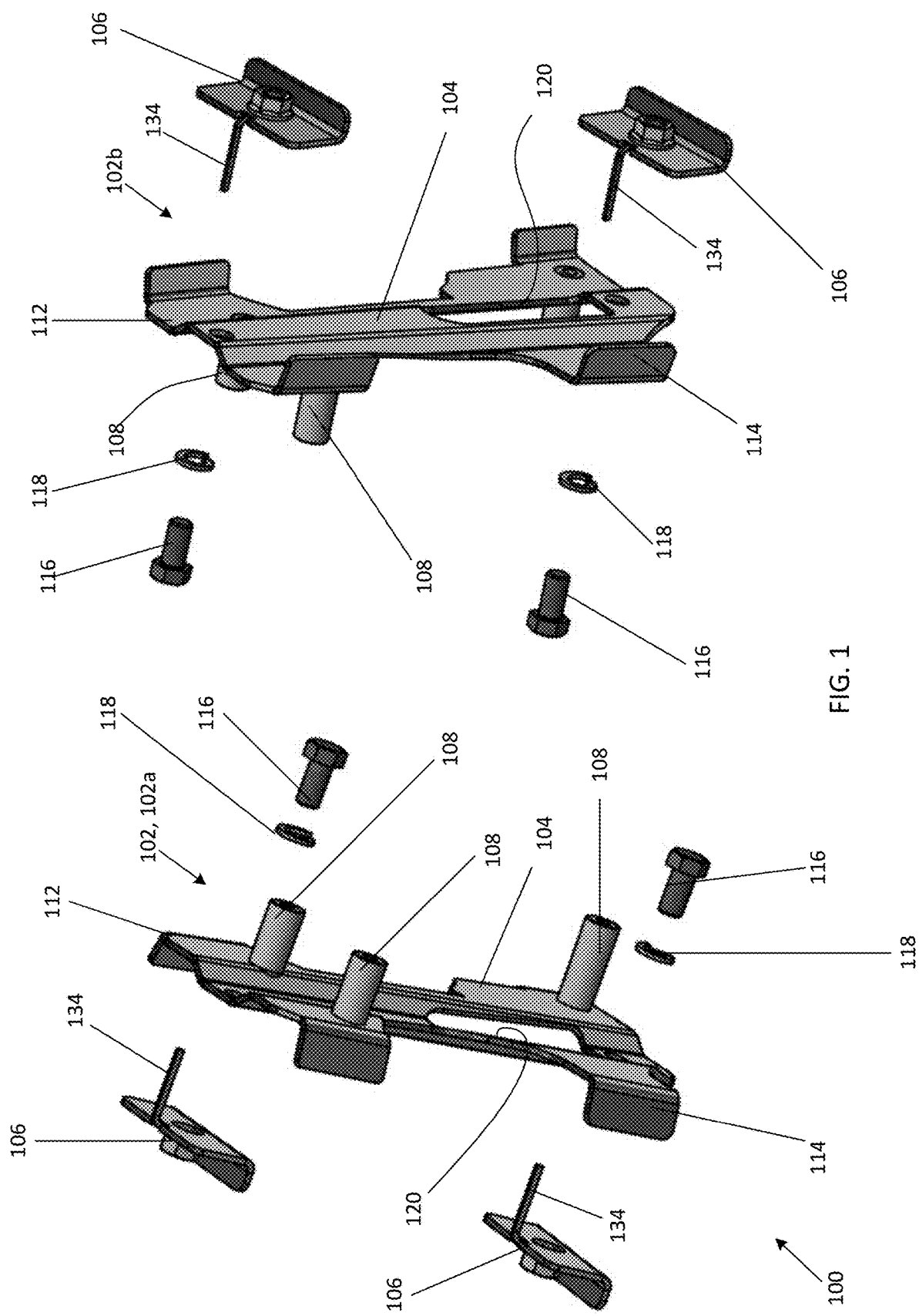
FIG. 1 is an exploded perspective view of an exemplary embodiment of a mounting assembly.
Figure 18:
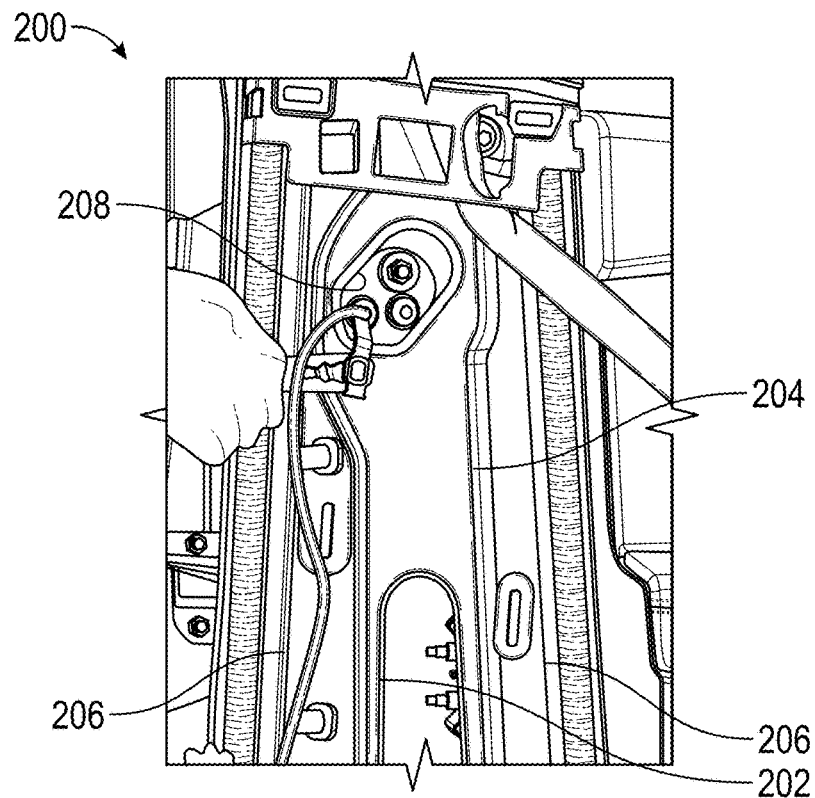
FIG. 18 is a side elevational view of an exemplary B-pillar in a vehicle with an interior trim panel removed.

FIG. 1 illustrates a suspended mounting assembly 100 configured to couple a partition assembly to a vehicle, for example, at the B-pillar 200 (see FIG. 18). Generally, the B-pillar is a closed steel structure that is welded to the floor and roof of the vehicle to provide structural support for the roof. The illustrated assembly 100 includes two suspended mounting anchors 102, a driver side mounting anchor 102*a* (also referred to as a right-side mounting anchor, i.e., when viewing the vehicle head-on) and a passenger side mounting anchor 102*b* (also referred to as a left-side mounting anchor, i.e., when viewing the vehicle head-on). As shown in FIG. 1, the right side mounting anchor 102*a* and the left side mounting anchor 102*b* can be mirror images of one another. The mounting anchors 102 are referred to as "suspended" because they do not extend to a floor and/or a roof of the vehicle, or otherwise require attachments to the floor and/or the roof to function, which advantageously allows the partition assembly to be mounted such that there is additional floor space in the rear occupant area and advantageously prevents or mitigates damage to the roof and/or the floor of the vehicle (which may affect the structural integrity of the vehicle and/or detract from its appearance if the partition is later removed).

Each mounting anchor 102 can generally comprise a body portion 104 and one or more nut plates/clamp members/brackets 106. The mounting anchor assembly 100 can be coupled to a vehicle such that a portion of the B-pillar 200 (e.g., the wall of the B-pillar 200 nearest the longitudinal axis of the vehicle) is sandwiched between the body portion 104 and the brackets 106 to secure the mounting anchor assembly 100 in place.

Each body portion 104 can include one or more bosses 108 extending from the body portion 104. The bosses 108 can be used to couple a portion of a partition assembly (e.g., a mounting bracket 110, shown in FIG. 28) to the B-pillar 200, thereby anchoring the partition assembly to the vehicle. In the illustrated embodiment, each body portion 104 can comprise three bosses 108, however, in other embodiments, each body portion 104 can have a greater or fewer number of bosses 108. In the illustrated embodiment, the bosses 108 are disposed in a substantially triangular shape, with two bosses 108 disposed adjacent one another and adjacent a first end portion 112 (e.g., nearer the ceiling of the vehicle when the mounting anchor 102 is installed) and an additional boss 108 disposed adjacent the second end portion 114 (e.g., nearer the floor of the vehicle when the mounting anchor 102 is installed). In other embodiments, the bosses 108 can be disposed in any shape or pattern. In some embodiments, the bosses 108 can be formed integrally with the body portion 104. In other embodiments, such as the illustrated embodiment, each boss 108 can be formed separately from the body portion and can extend through an opening 111 in the body 104. The bosses 108 can be permanently or removably coupled to the body portion 104 (e.g., by welding, adhesives, mechanical means such as screws, bolts, clamps, etc.) Each boss 108 can comprise a threaded internal bore 109 (FIG. 13) configured to receive a fastener, such as a correspondingly threaded bolt.

Figure 2:
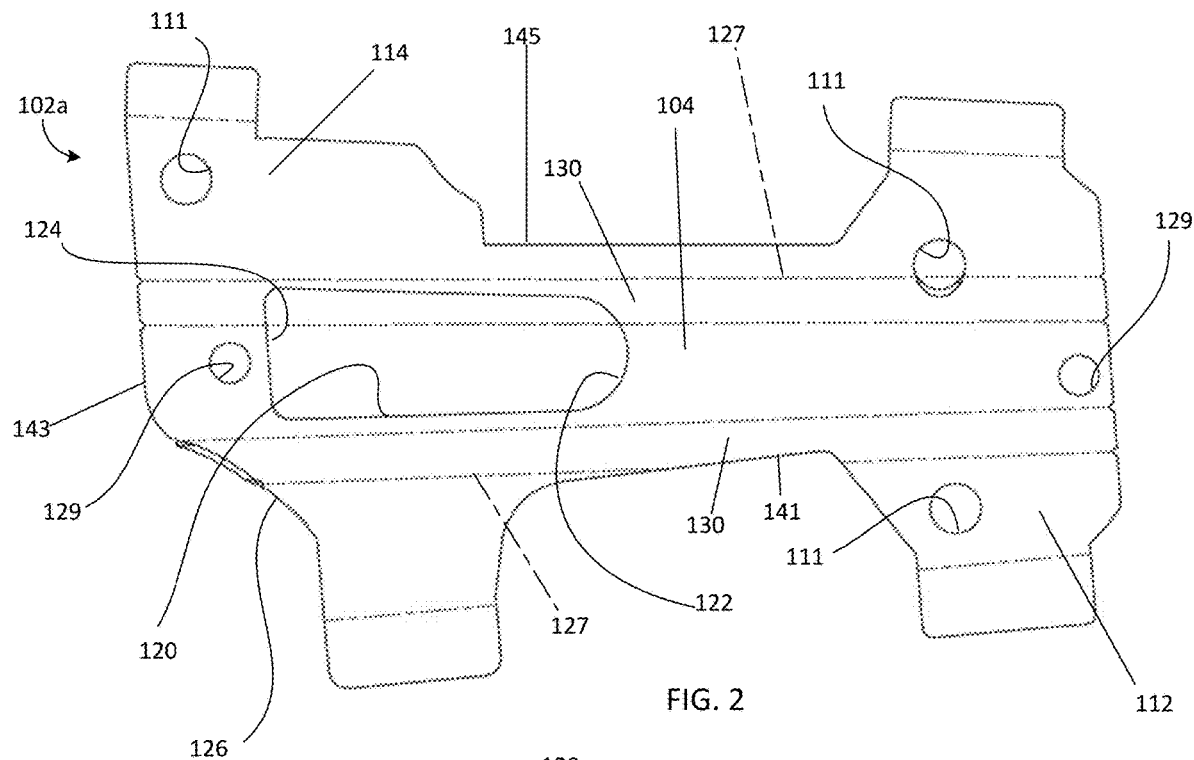
FIGS. 2-3 are perspective views of a driver side suspended mounting anchor of the mounting assembly of FIG. 1.
Figure 3:
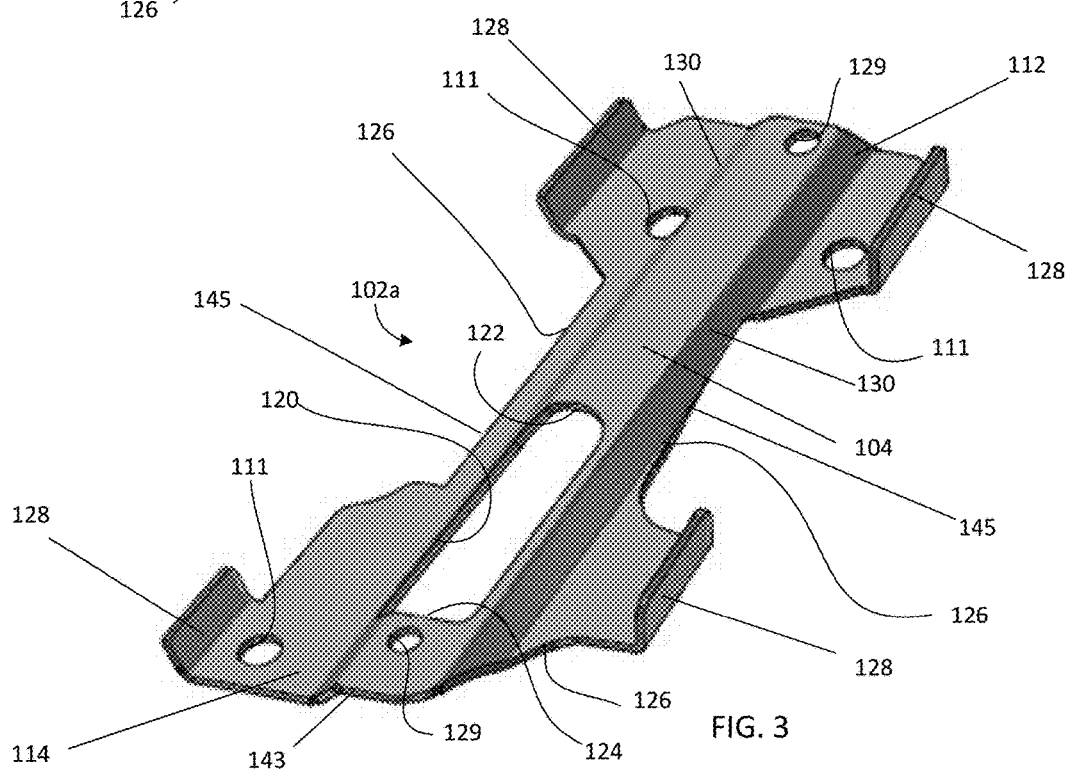

Referring to FIGS. 2-5, the body portion 104 of each anchor 102a, 102b can further comprise an opening 120 extending through a thickness of the body portion 104. The opening 120 can be sized such that a bracket 106 can pass through the opening 120, for example, during installation of the mounting anchor assembly 100 (see e.g., FIGS. 22-23). In the illustrated embodiment, as shown in FIG. 2, the opening 120 is an elongated opening having a first, rounded end 122 and a second, rectangular end with rounded corners 124. In other embodiments, the opening 120 can have any of various shapes sized to allow the bracket 106 to pass through the opening. The opening 120 can be disposed in the body portion 104 such that when the anchor 102 is installed, the opening 120 aligns with a corresponding opening 202 (see FIG. 18) in the B-pillar 200, e.g., as shown in FIG. 23.

Figure 4:
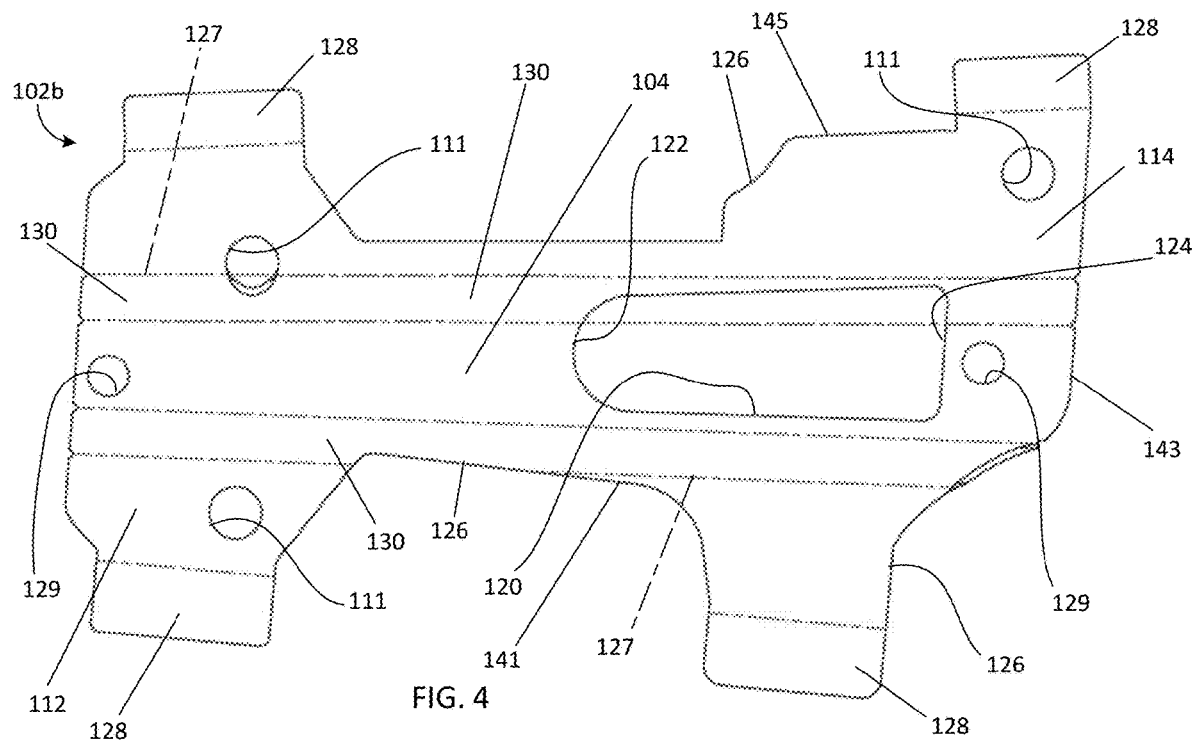
FIGS. 4-5 are perspective views of a passenger side suspended mounting anchor of the mounting assembly of FIG. 1.
Figure 5:
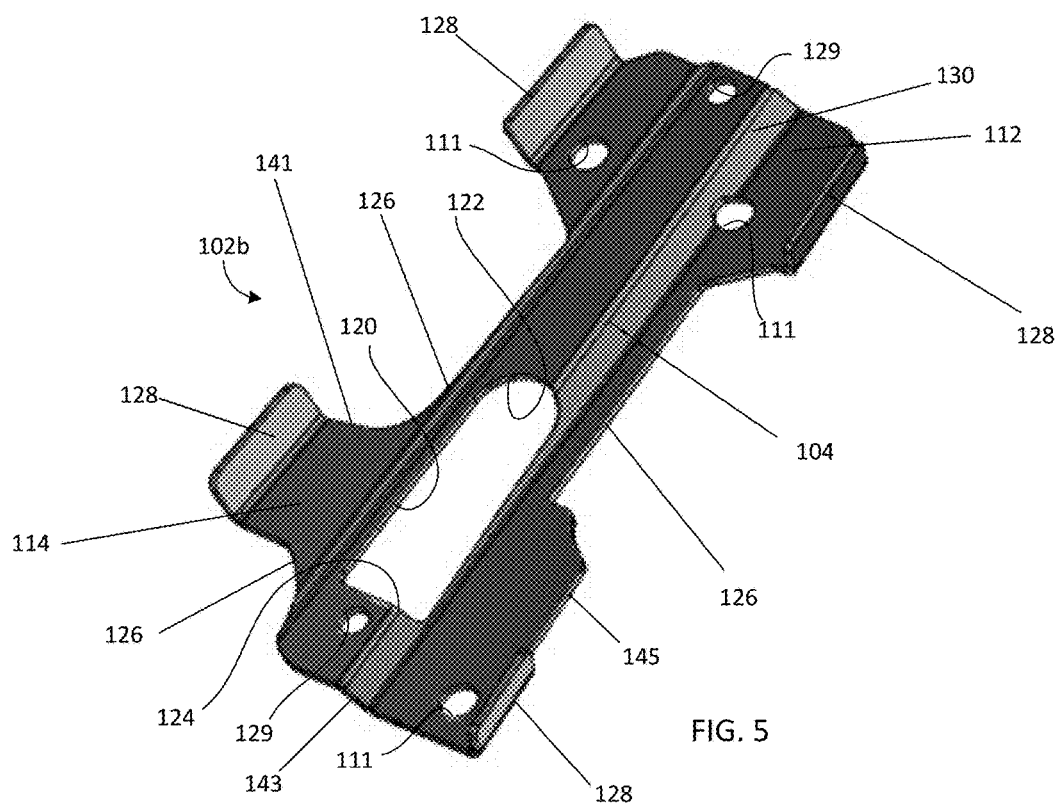

Referring to FIGS. 2-5, each body portion 104 can further comprise one or more cutouts 126 and one or more steps or ridges 130. FIGS. 2 and 4 show the mounting anchors 102a, 102b in a flattened configuration with the changes in elevation for the ridges 130 and the flanges 128 shown by dotted lines 127. The cutouts 126 and ridges 130 can be arranged and sized such that at least a portion of the body portion 104 can correspond with and be disposed within a recess 204 (FIG. 18) in the B-pillar 200. By configuring the body portion 104 to have one or more areas that fit against areas of the B-pillar, the resulting connection between the body portion 104 and the B-pillar is more secure and resistant to rotation, such as in response to forces experienced in a collision or efforts to tamper with the partition. In some embodiments, such as the illustrated embodiment, the body portion 104 can further comprise one or more flanges or ears 128 configured to extend around the edge portions 206 (FIG. 18) of the B-pillar 200.

Figure 27:
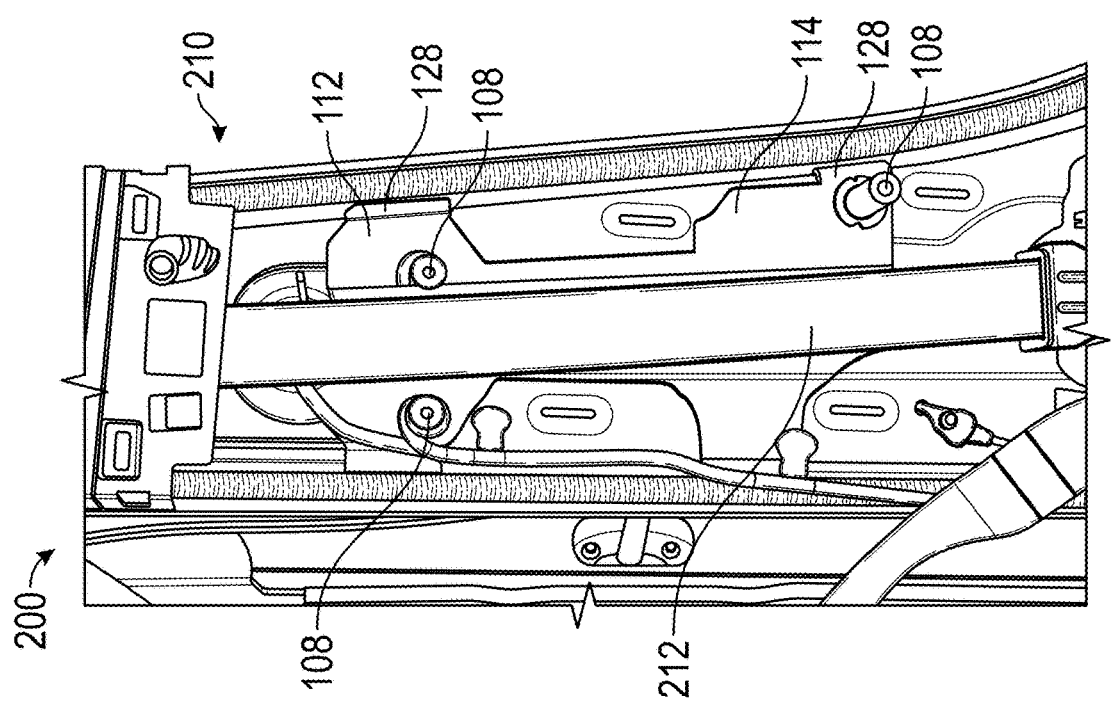
Figure 30:
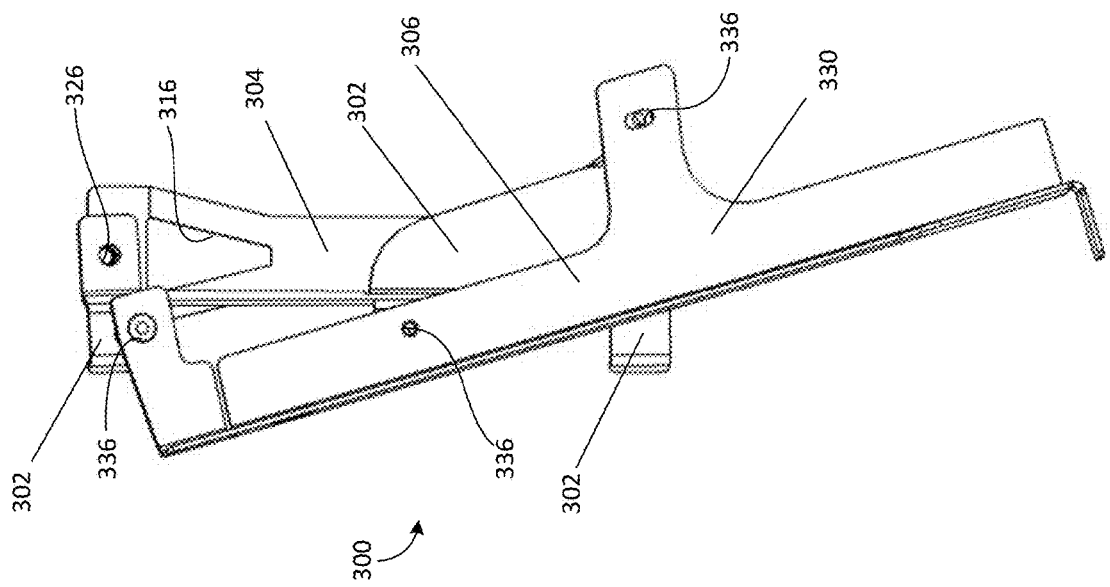
FIGS. 29-32 illustrate various views of another exemplary embodiment of a mounting assembly.

In the illustrated embodiment, each mounting anchor 102 has two ridges 130 extending the length of the mounting anchor and four flanges 128 that extend outwardly away from a longitudinal axis of the vehicle when the mounting anchors are coupled to the B-pillar (see e.g., FIG. 27). However, in other embodiments, the mounting anchors 102 can have a greater or lesser number of ridges and/or flanges as required by the geometry of the portion of the vehicle to which the mounting anchor is to be mounted. As best seen in FIGS. 11, 13, and 17 the ridges 130 can define a central depression 151 extending along the length of the mounting anchor 102. The central depression 151 can be sized and shaped to sit within the corresponding recess 204 of the B-pillar As mentioned, the edge portions of each mounting anchor can comprise a variety of cutouts 126 configured to allow the mounting anchor 102 to be disposed around the pre-existing shape of the B-pillar. For example, in the illustrated embodiment, the first side edge 141, the bottom edge 143, and the second side edge 145 can each comprise a cutout 126. However, in other embodiments, the mounting anchor 102 can have any of various cutouts disposed on any of various edges in order to conform to the shape of the B-pillar and/or the portion of the vehicle on which the mounting anchor is mounted.

Each anchor 102 can further comprise one or more bracket openings 129 positioned such that a fastener 116 (see FIG. 1), such as a bolt or screw, can pass through the opening 129, through the B-pillar 200 (FIG. 18), and couple the bracket 106. Each fastener 116 can further comprise a washer 118 (FIG. 1).

Figure 26:
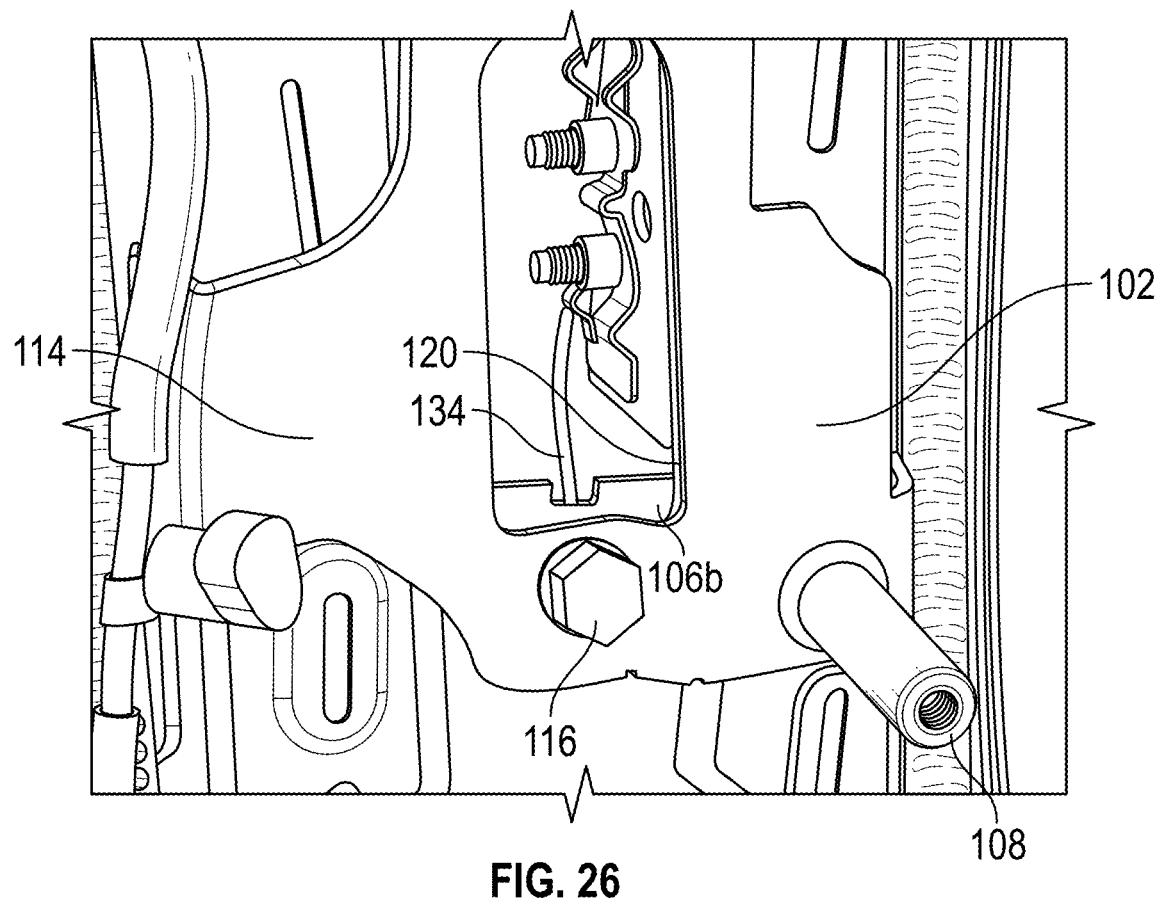

Referring to FIGS. 6-9, each bracket 106 can generally comprise an L-shaped body portion 132 including a first wall 131 and a second wall 133, a guide member 134, and a fastener opening 137 surrounded by a receiving member 136. The body portion 132 can be sized such that the bracket 106 can pass through the opening 120 in the anchor 102. The guide member 134 can be a bendable and/or adjustable member configured to allow a user to position the bracket 106 within the B-pillar 200 during installation of the mounting assembly 100 (e.g., by gripping the guide member). The guide member 134 can also be used to hang the bracket 106, for example, by setting the bent guide member 134 on a surface. Once the mounting assembly 100 is installed, the guide member 134 can be bent out of the way, for example, by bending the guide member 134 such that it sits within the B-pillar, such as shown in FIG. 26. The fastener opening 137 can extend through a thickness of the body portion 132 and can comprise receiving member 136, such as a threaded nut, configured to couple a fastener extending through the fastener opening 137.

FIGS. 10-13 illustrate additional views of the driver side suspended mounting anchor 102a, and FIGS. 14-17 illustrate additional views of the passenger side suspended mounting anchor 102b.

Referring to FIGS. 18-27, the mounting assembly 100 can be mounted to the B-pillar 200 of a vehicle in the following exemplary manner. The mounting assembly 100 can advantageously be coupled to the B-pillar using the existing B-pillar structures (e.g., a first opening 202, a recess 204, and a second opening 208) and without having to drill any additional openings. Referring to FIG. 18, as mentioned previously, an exemplary B-pillar can comprise an opening 202 extending through an inner wall of the B-pillar, a recess 204, and edge portions 206. The B-pillar 200 can further comprise an additional opening 208 disposed nearer the ceiling of the vehicle than opening 202.

Figure 19:
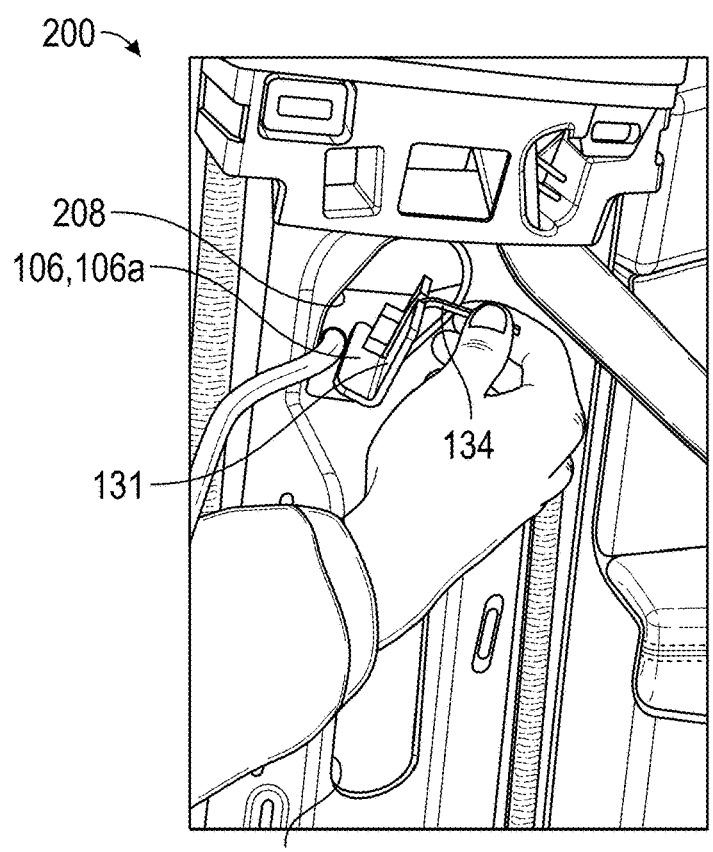
FIGS. 19-27 illustrate an exemplary method of installing a suspended mounting anchor on the B-pillar of FIG. 18.
Figure 20:
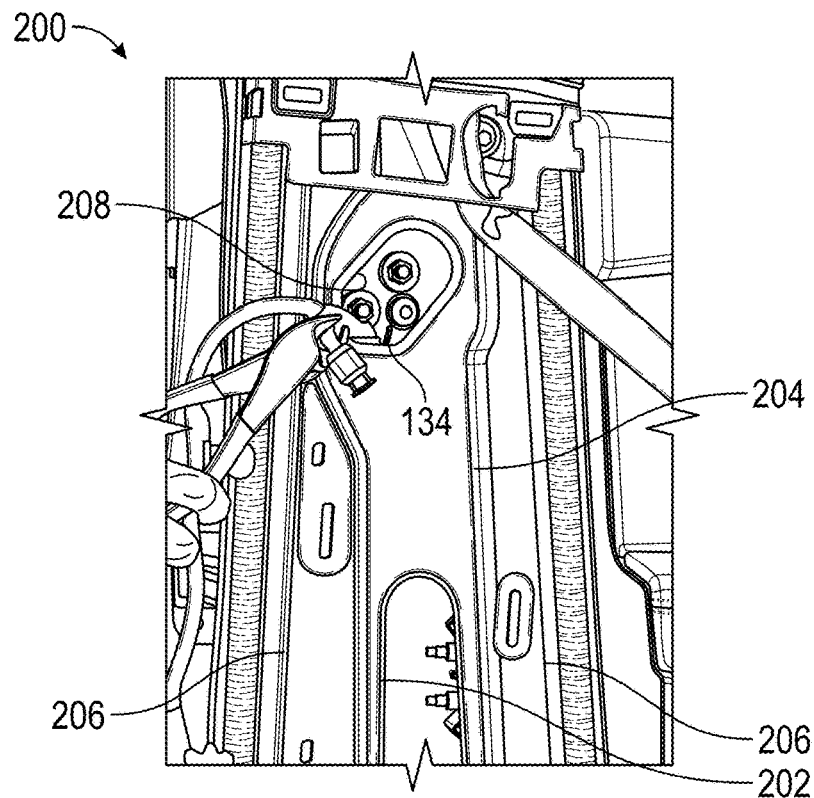
Figure 21:
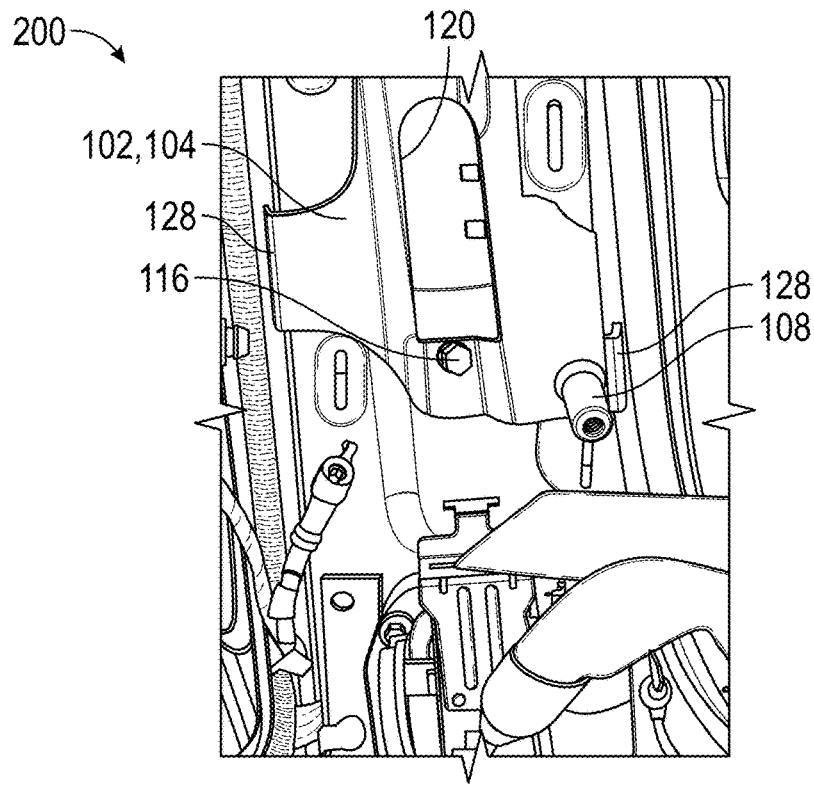

Referring to FIG. 19, a first bracket 106a can be passed through the opening 208 with the guide member 134 bent at an approximately 90-degree angle relative to the first wall 131. For example, a user can grip the bracket 106a using the guide member 134 to insert the body portion 132 through the opening 208 As shown in FIG. 20, the guide member 134 can be used to hang the bracket 106 from the opening 208 such that the bracket 106 remains accessible. As shown in FIG. 21, an anchor 102 can then be disposed against the B-pillar 200 such that a portion of the body portion 104 (e.g., the central depression 151) is disposed within the recess 204, such that the flanges 128 extend around the edge portions 206 of the B-pillar 200, and such that the opening 120 aligns with at least a portion of the opening 202.

Figure 22:
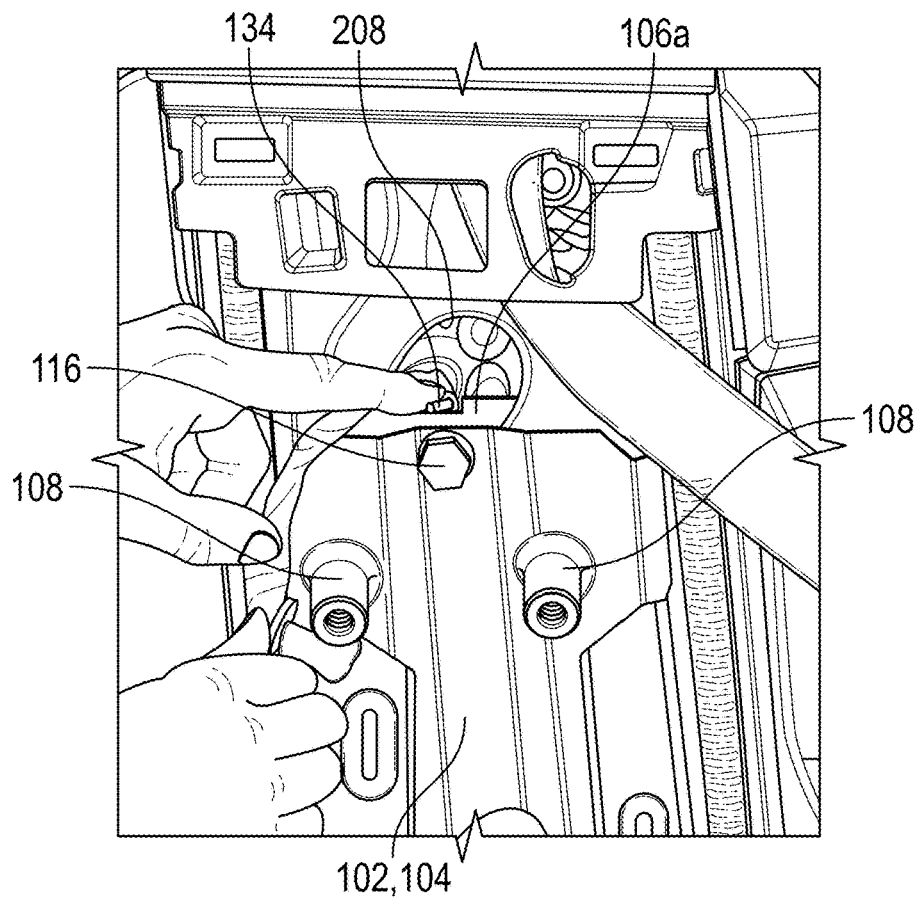
Figure 23:
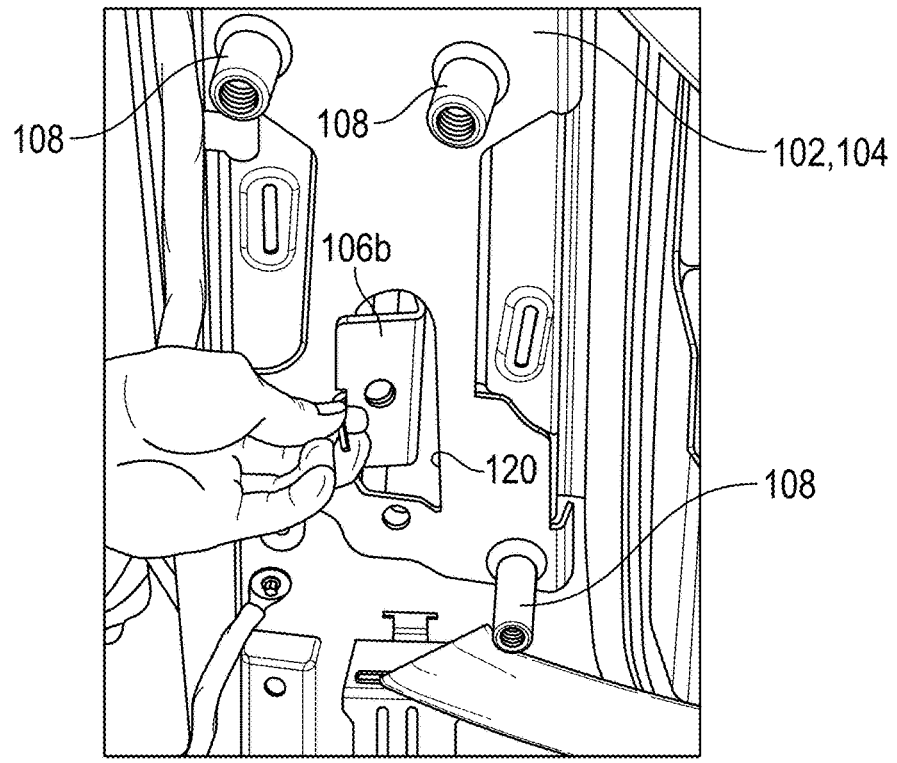

As shown in FIG. 22, using the guide member 134, a user can position the first bracket 106a such that the opening 129 (FIG. 3) in the anchor 102 is aligned with the fastener opening 136 (FIG. 6). A fastener 116 (see e.g., FIG. 1) can extend through the anchor 102 and into the bracket 106a to couple a first end portion 112 of the anchor to the B-pillar 200.

Figure 24:
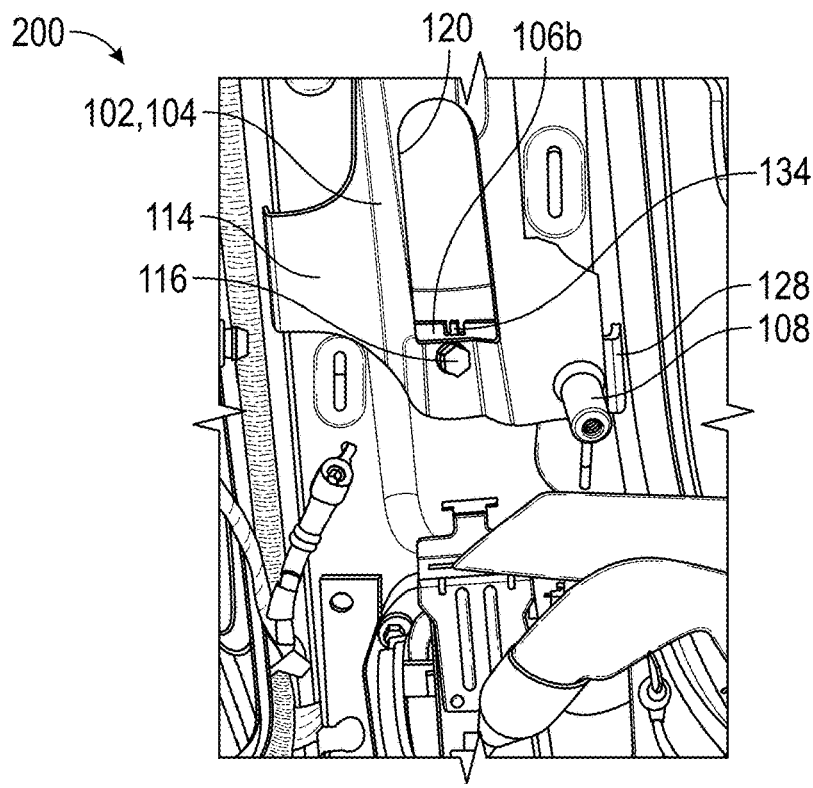

Referring to FIG. 23, a second bracket 106b can be passed through the opening 120 in the anchor 102 and through the opening 202 in the B-pillar 200. A user can use the guide member 134 to align the fastener opening 136 with the opening 129 in the second end 114 of the body portion 104. As shown in FIG. 24, a fastener 116 (e.g., a screw or a nut) can extend through the anchor 102 and into the bracket 106 to couple to the second end portion 114 of the anchor 102 to the B-pillar.

Figure 25:
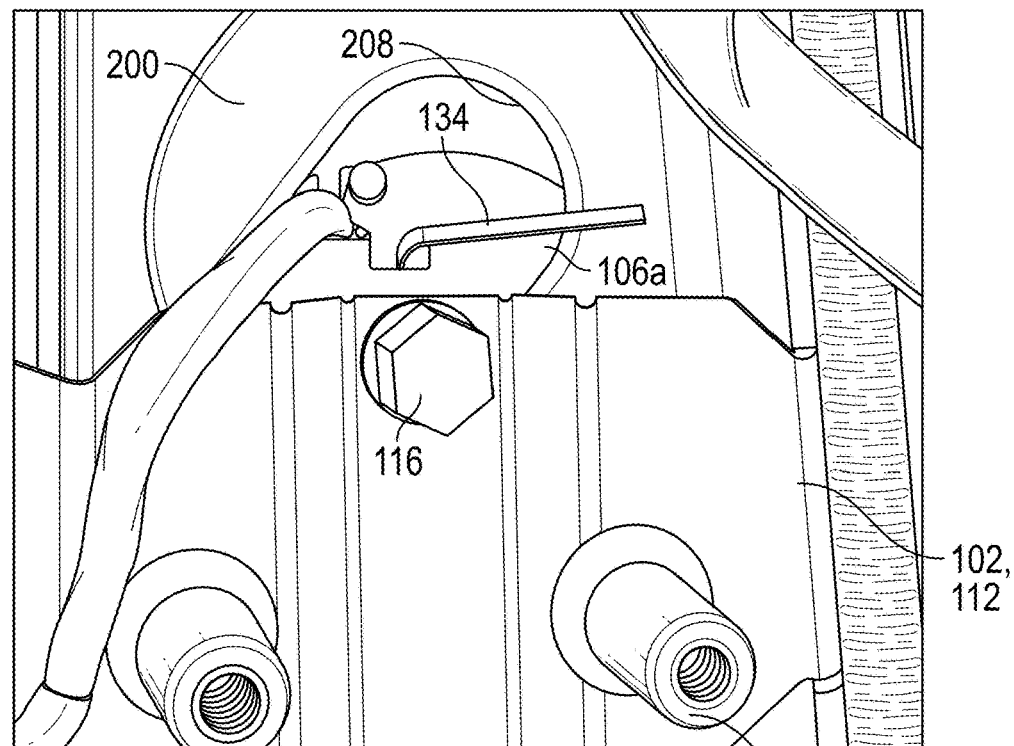

As shown in FIGS. 25-26, once the first and/or second end portions 112, 114 of the anchor 102 are coupled to the B-pillar, the guide portion 134 of each bracket 106 can be bent or otherwise deformed such that they no longer extend at a substantially 90-degree angle relative to the first wall 131 of the bracket 106. For example, the guide member 134 of the first bracket 106a can be bent sideways such that is substantially flat against the inner wall of the B-pillar, and the guide member 134 of the second bracket 106b can be bent back into the opening 120. In other embodiments, both guide members 134 can be bent sideways or both guide members 134 can be bent back into the opening.

As shown in FIG. 27, the anchor 102 can be coupled to the B-pillar 200 such that the seatbelt assembly 210 is undisturbed. The seatbelt 212 can be disposed within the recessed portion of the body portion 104, and the upper bosses 108 (e.g., disposed on the first end portion 112 of the anchor 102) can be disposed on either side of the seatbelt 212. The lower boss 108 can be disposed to one side of the seatbelt 212, for example, toward the rear occupant area or toward the front occupant area.

Figure 28:
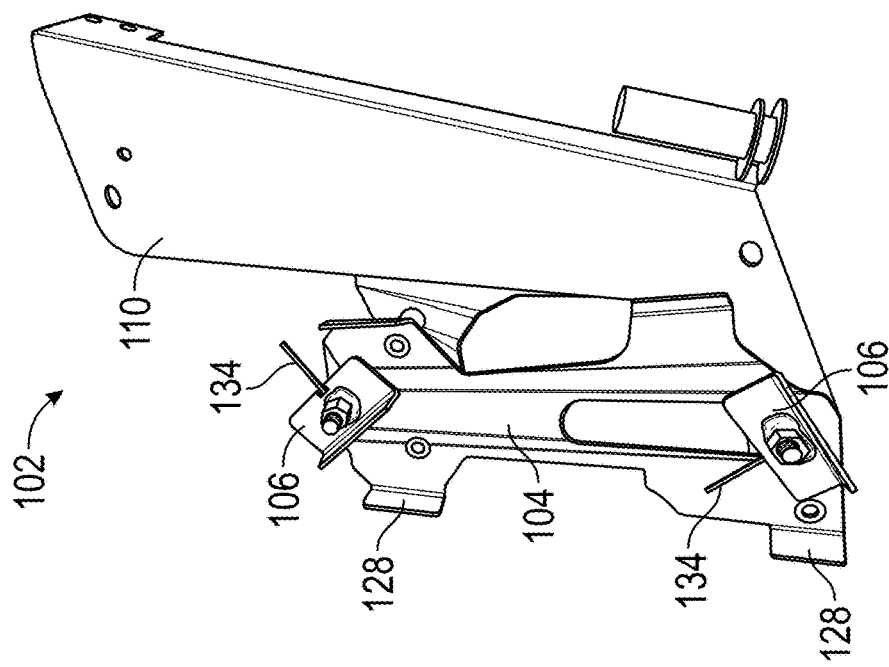
FIG. 28 is a perspective view of the suspended mounting anchor of the mounting assembly of FIG. 1 coupled to an exemplary mounting bracket.

Once the anchor 102 has been coupled to the B-pillar, a portion of a partition assembly, such as a mounting bracket 110, can be mounted the anchor 102, as shown in FIG. 28. Once or more fasteners (not shown) such as bolts or screws can extend through the mounting bracket 110 and into the bosses 108, thereby securing the mounting bracket and thus the partition assembly to the B-pillar.

FIGS. 29-32 illustrate another embodiment of a mounting assembly 300. Mounting assembly 300 can include generally a mounting anchor 302, a nut plate/bracket/clamp member 304, and a mounting bracket 306 (e.g., a mounting bracket of a partition assembly). Though only one mounting anchor 302, clamp member 304, and mounting bracket 306 are shown, it should be recognized that mounting assembly 300 can comprise any number of mounting anchors 306, clamp members 304, and/or mounting brackets 306. For example, mounting assembly 300 can comprise a driver side mounting anchor, clamp member and mounting bracket, and a passenger side mounting anchor, clamp member, and mounting bracket.

Figure 29:
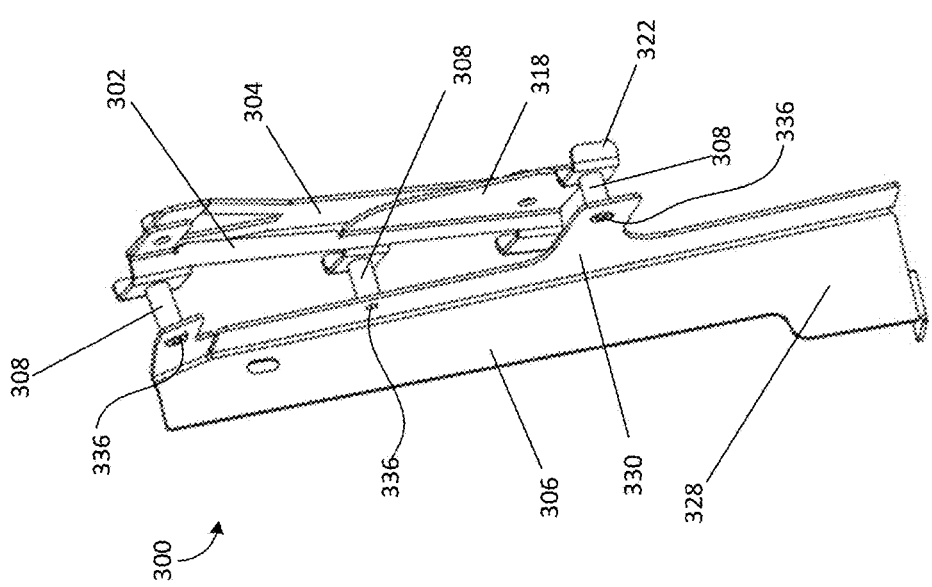
Figure 32:
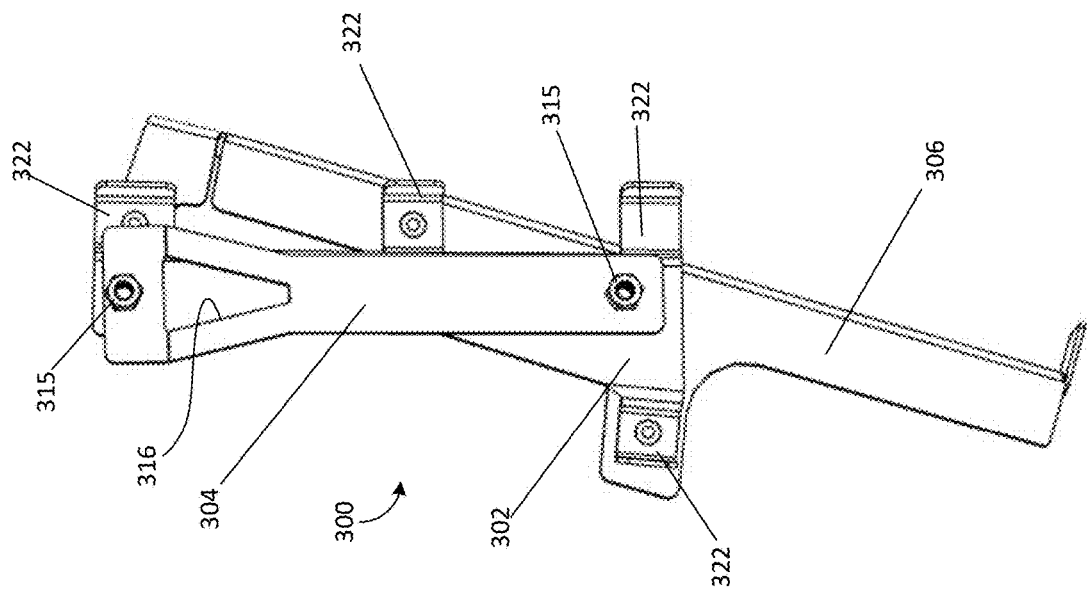
Figure 31:
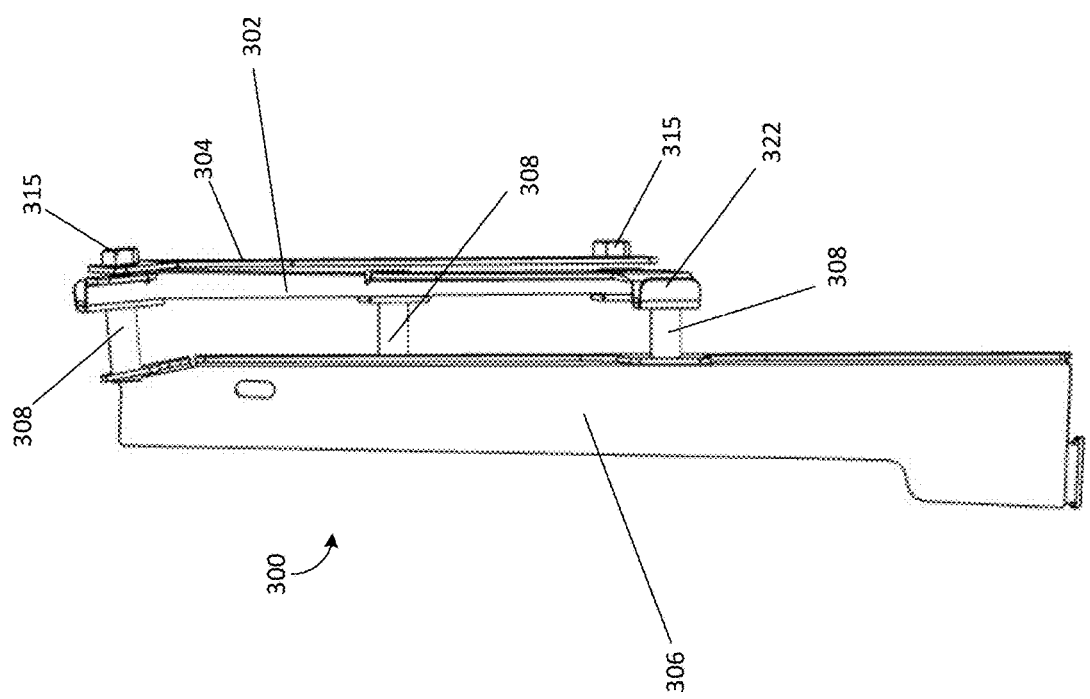

As shown in FIG. 29, the mounting bracket 306 can be coupled to the mounting anchor 302 via one or more bosses 308 extending from the mounting anchor 302. One or more fasteners (not shown) such as bolts or screws, can extend through the mounting bracket 306 and into the bosses 308, coupling the mounting bracket 306 to the anchor 302.

Figure 34:
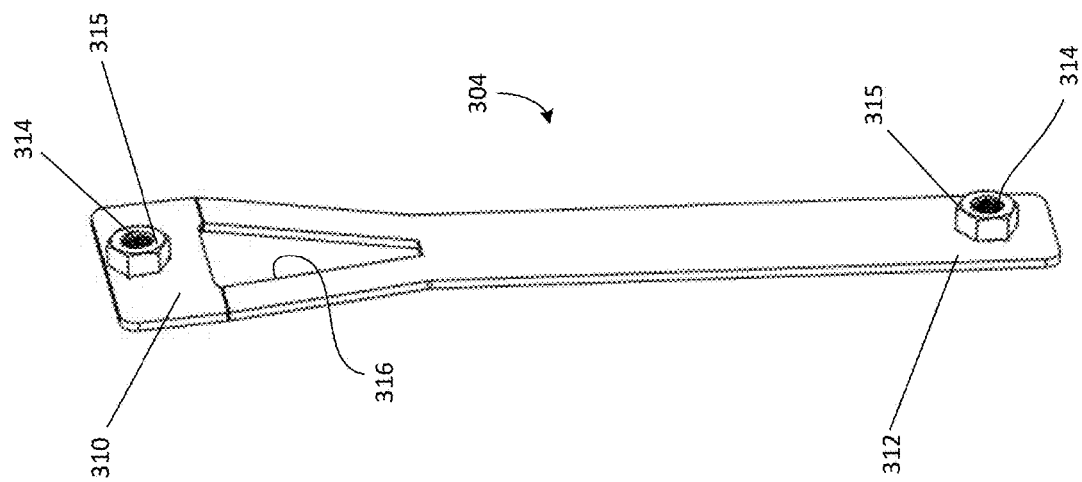
FIGS. 33-34 illustrate various views of a clamp member of the mounting assembly of FIGS. 29-32.
Figure 33:
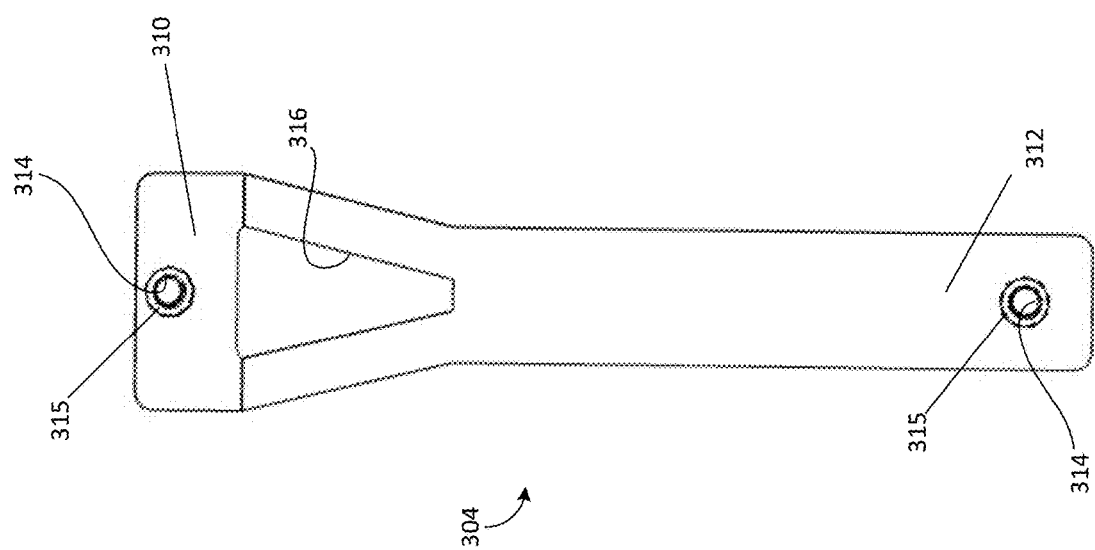

Referring to FIGS. 33-34, the nut plate/bracket/clamp member 304 can comprise an elongated member including a first end portion 310 and a second end portion 312. Each end portion 310, 312 can comprise a respective fastener opening 314 configured to receive a fastener. The fastener opening 314 can be surrounded by a nut 315 having a threaded internal bore. The first end portion 310 can comprise a triangular opening 316.

Figure 36:
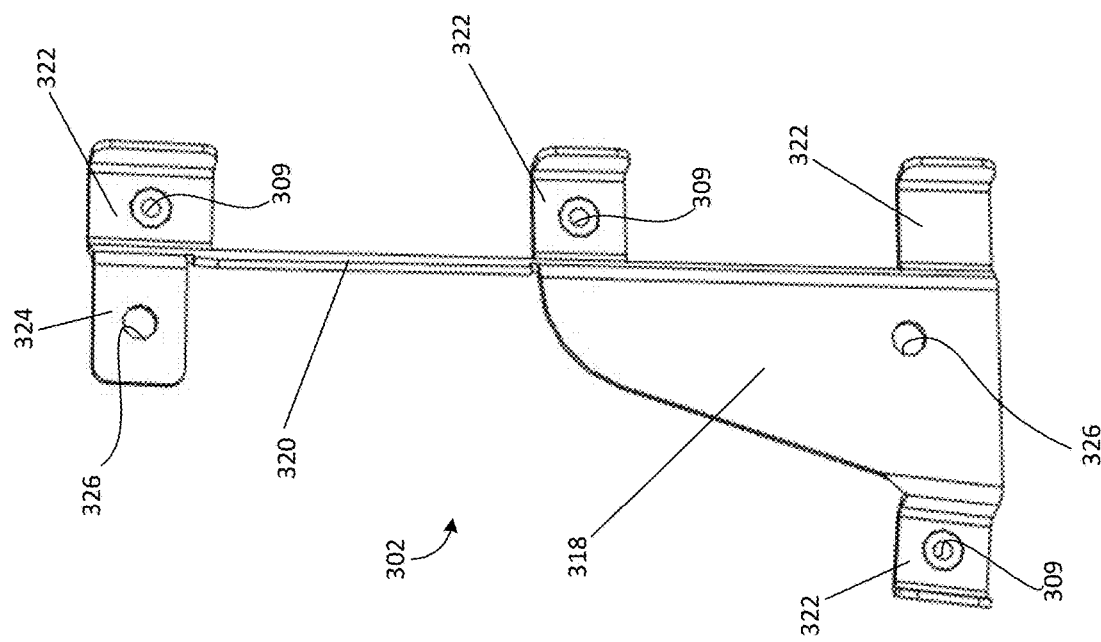
FIGS. 35-36 illustrate various views of an anchor of the mounting assembly of FIGS. 29-32.
Figure 35:
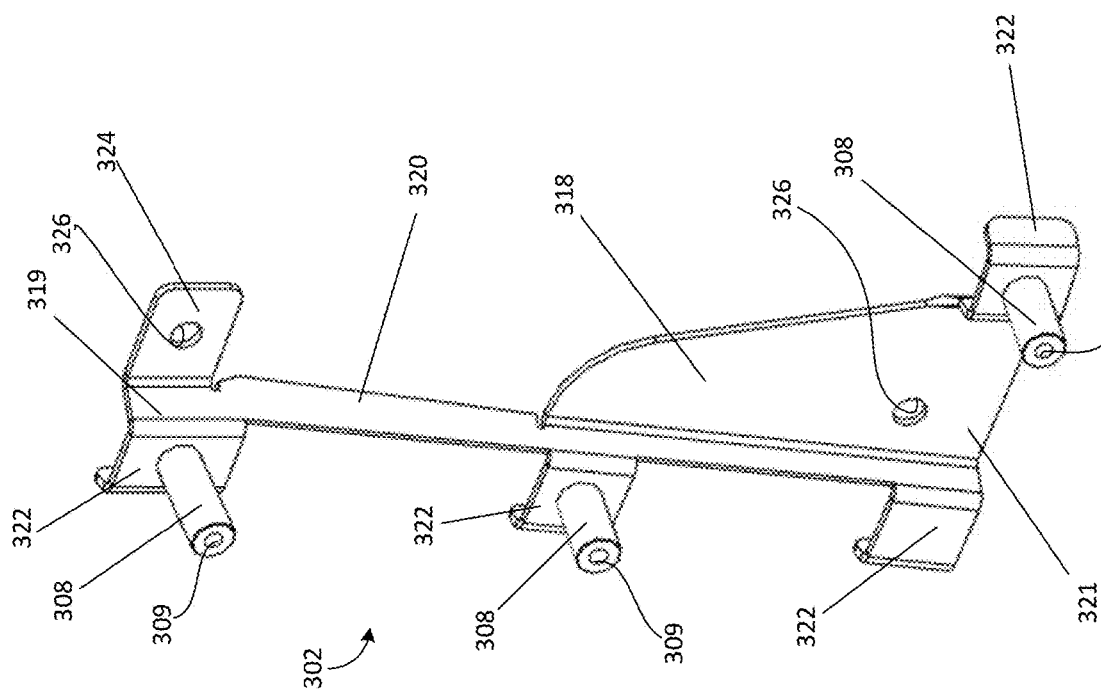
Figure 39:
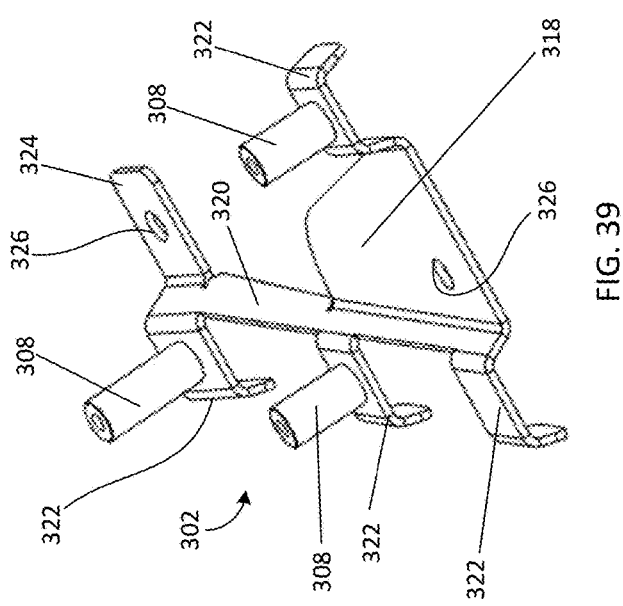
FIG. 39 is a perspective view of an anchor of the mounting assembly of FIGS. 29-32.
Figure 42:
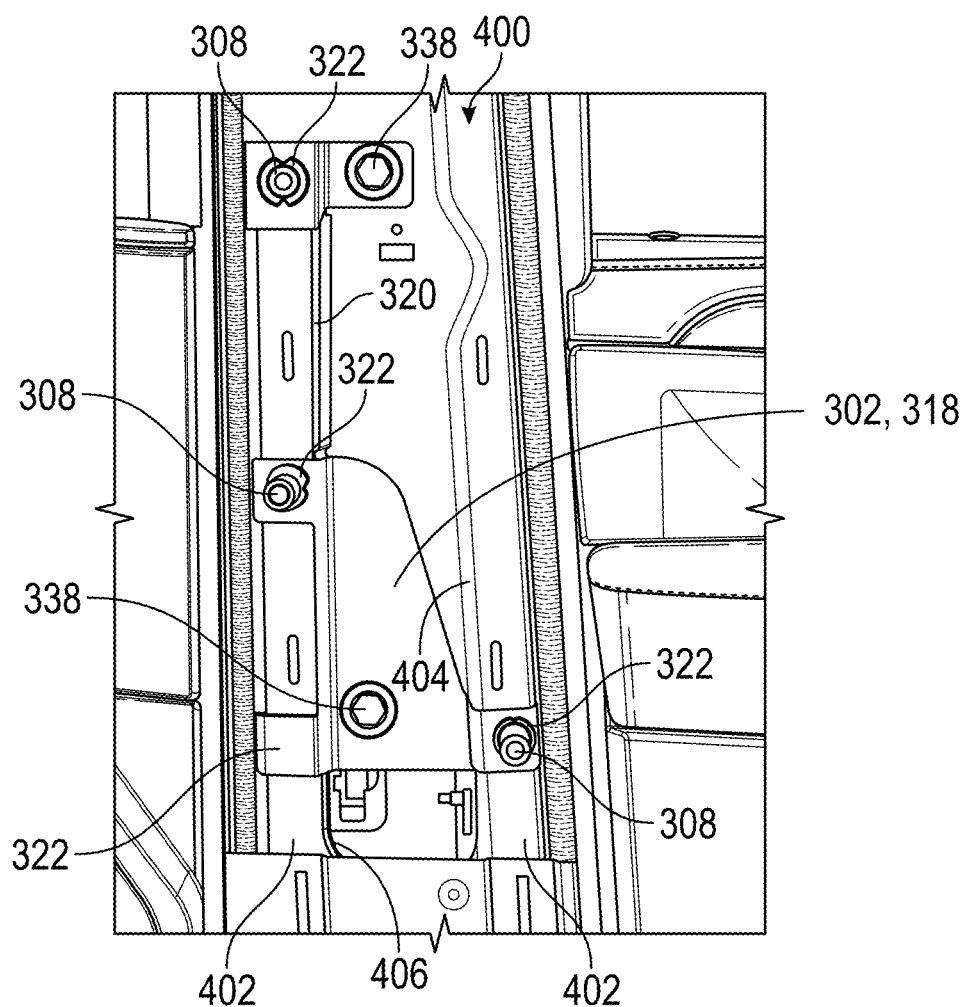
FIG. 42 is a side elevational view of an anchor of the mounting assembly of FIGS. 29-32 coupled to an exemplary B-pillar in a vehicle.

Referring to FIGS. 35-36, the anchor 302 can comprise a body portion 318 and an extension portion 320, and can have a first end portion 319 and a second end portion 321. In the illustrated embodiment, the body portion 318 has a shape substantially like a right-triangle with a curved hypotenuse, however, in other embodiments, the body portion 318 can have any of various shapes. The extension portion 320 can be disposed adjacent the body portion 318 and a portion of the extension portion 320 can extend past the body portion 318 toward the ceiling of the vehicle when the anchor is installed on a B-pillar 400 (see e.g., FIG. 42). As best seen in FIG. 39, the extension portion 320 can be disposed at an angle relative to the base portion. When disposed on the B-pillar 400, such as shown in FIG. 42, the body portion 318 can sit within the recess 404 of the B-pillar 400, and the extension portion 320 can extend along an edge of the recess 404.

The anchor 302 can further comprise one or more ears or projections 322. The projections 322 can have a curved C-shape in cross-section (see e.g., FIG. 39) and can be configured to extend around edge portions 402 (FIG. 42) of the B-pillar 400. In the illustrated embodiment, the anchor 302 can comprise four projections 322. However, in other embodiments, the anchor 302 can have any number of projections. As shown in FIG. 35, in the illustrated embodiment, the anchor 302 can comprise three projections 322 disposed axially along a length of the anchor 302. One or more of the projections 322 can comprise a boss 308 extending from the projection. For example, the two projections 322 disposed nearer the first end 319 can each comprise a boss 308 extending from the ear 322 and the body portion 318 can comprise an additional projection 322 including an additional boss 308. The bosses 308 can extend inwardly toward the central longitudinal axis of the vehicle when the anchor is installed on the B-pillar. Each boss 308 can comprise an internal bore 309 (e.g., a threaded internal bore) configured to receive a fastener, such as a correspondingly threaded bolt.

The first end 319 of the anchor 302 can further comprise a flange 324. The flange 324 and the body portion 318 can each comprise an opening 326 configured to allow the anchor 302 to be coupled to the clamp member 304.

Figure 38:
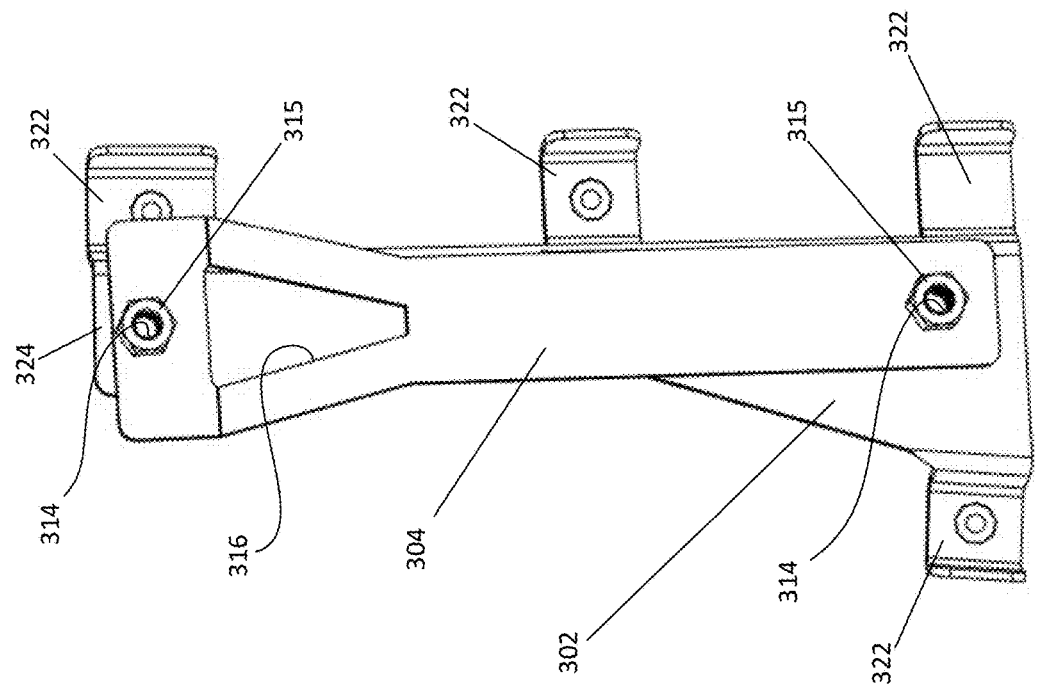
FIGS. 37-38 illustrate various views of an anchor and clamp member of the mounting assembly of FIGS. 29-32 coupled together.
Figure 37:
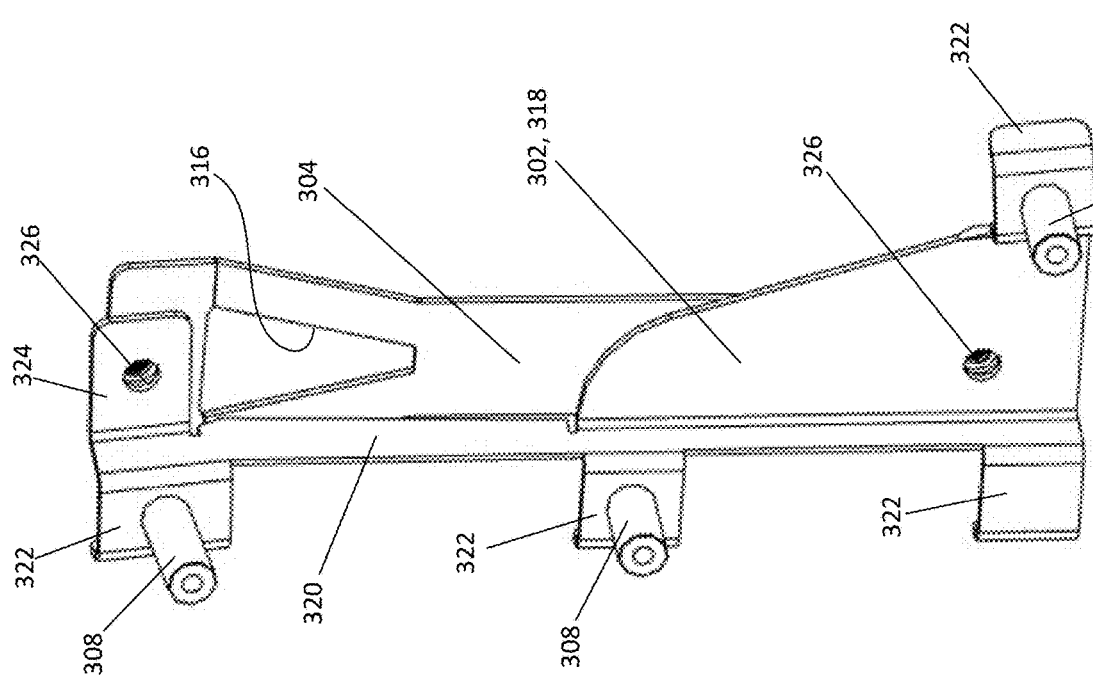

As shown in FIGS. 37-38, the openings 326 in the anchor 302 can be aligned with the fastener openings 314 in the clamp member 304. The mounting anchor assembly 300 can be coupled to a vehicle such that a portion of the B-pillar 400 (e.g., the wall nearest the central longitudinal axis of the vehicle) is sandwiched between the anchor 302 and the clamp member 304. Fasteners (e.g., screws or bolts) can extend through openings 326 and 314 to couple the mounting anchor assembly 300 to the B-pillar.

Figure 40:
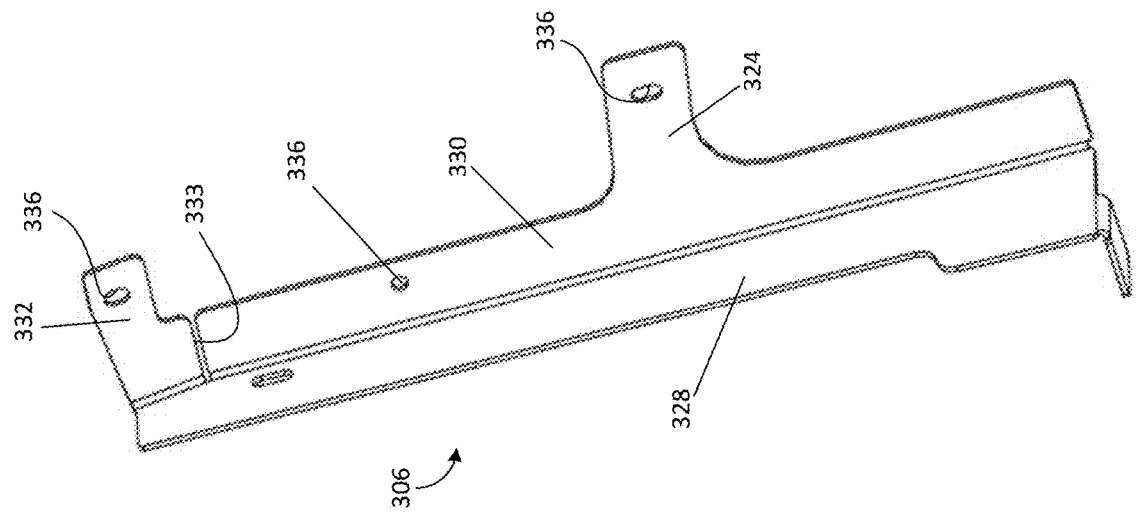
FIGS. 40-41 are various views of a mounting bracket of the mounting assembly of FIGS. 29-32.
Figure 41:
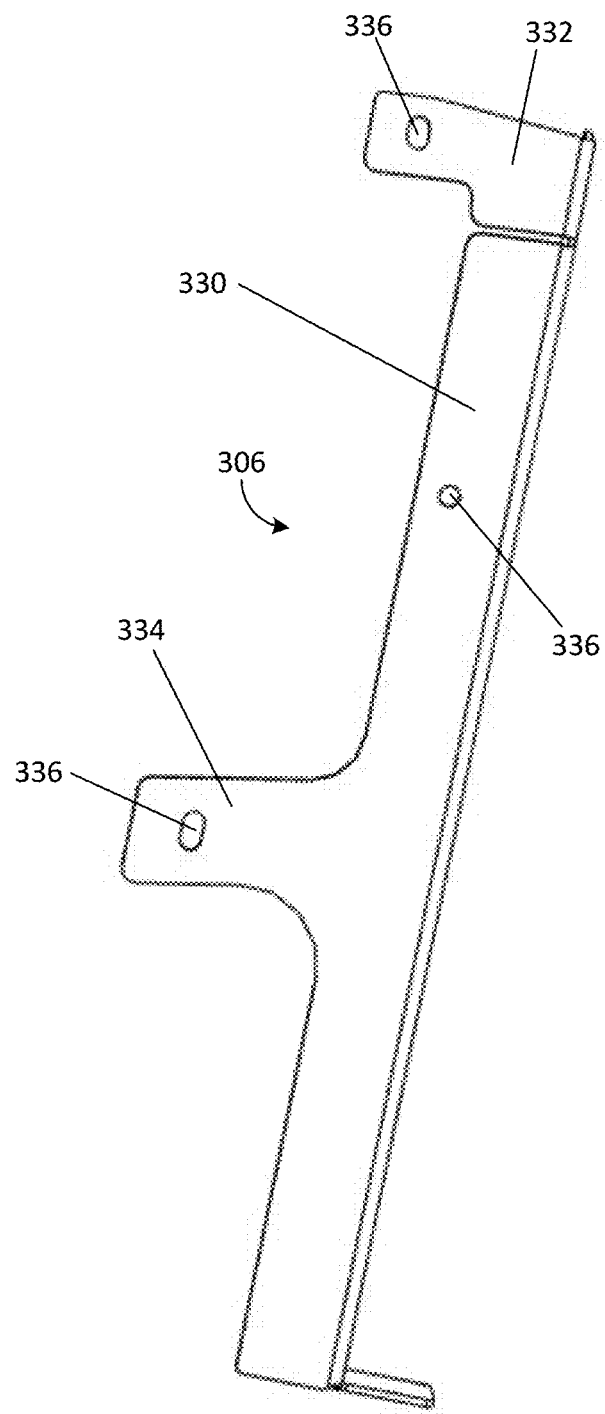

A partition assembly can be coupled to the anchor 302 via mounting bracket 306. As shown in FIGS. 40-41, the mounting bracket 306 can be an elongated member having an L-shape in cross-section including a first side 328 and a second side 330. The second side 330 can include first and second protrusions 332, 334, each comprising an opening 336. In some embodiments, such as the illustrated embodiment, the first protrusion 332 can be separated from the second side 330 by a gap 333.

The mounting bracket 306 can comprise an additional opening 336 extending through the second side wall 330. When the anchor 302 is mounted to the B-pillar 400, such as shown in FIG. 42, the mounting bracket 306 can be aligned with the anchor 302 such that each opening 336 aligns with a respective boss 308 of the anchor 302, as shown in FIG. 29. A respective fastener, such as a bolt or screw, can extend through each opening 336 and into the inner bore 309 of a respective boss 308, thereby coupling the mounting bracket 306 (and thus a partition assembly couplable to the mounting bracket) to the B-pillar 400 via the anchor 302.

Referring to FIG. 42, an exemplary B-pillar 400 can comprise edge portions 402, a recess 404 extending along a longitudinal axis of the B-pillar, and an opening 406. Mounting assembly 300 can be mounted to the B-pillar 400 in the following exemplary manner. The clamp member 304 can be passed through the opening 406 and can be disposed on an opposing surface of the B-pillar (e.g., the surface facing the outside of the vehicle). The anchor 302 can be disposed on an inner surface of the B-pillar (e.g., the surface facing the central longitudinal axis of the vehicle) such that the body portion 318 is disposed within the recess 404 and such that the extension portion 320 extends along a wall of the recess 404. The projections 322 can be disposed such that they extend over the edge portions 402. The anchor 302 can then be coupled to the clamp member 304 using one or more fasteners 338 (e.g., bolts or screws) with the inner wall of the B-pillar 400 sandwiched between them. Once the anchor 302 is coupled to the B-pillar 400, the mounting bracket 306 can be coupled to the anchor 302 via one or more fasteners extending through the mounting bracket 306 and into the bosses 308.

General Considerations

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

All features described herein are independent of one another and, except where structurally impossible, can be used in combination with any other feature described herein. For example, a clamp member 304 as shown in FIG. 33 can be used in combination with mounting anchor 102 described herein. In another embodiment, clamp member(s) 106 as shown in FIG. 6 can be used in combination with the mounting anchor 302 shown in FIGS. 35-36.

As used in this application and in the claims, the singular forms "a," "an," and "the" include the plural forms unless the context clearly dictates otherwise. Additionally, the term "includes" means "comprises." Further, the term "coupled" generally means physically, mechanically, chemically, magnetically, and/or electrically coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

In view of the many possible embodiments to which the principles of the disclosure may be applied, it should be recognized that the illustrated embodiments are only preferred examples and should not be taken as limiting the scope of the disclosure. Rather, the scope is defined by the following claims. We therefore claim all that comes within the scope and spirit of these claims.

We claim:

1. A suspended mounting anchor, comprising:
   an anchor body configured to be disposed on a first surface of a B-pillar, the anchor body comprising one or more bosses extending from a surface of the anchor body, each boss comprising an inner bore including a threaded portion; and
   a clamp member configured to be disposed on a second, opposing surface of the B-pillar and coupled to the anchor body such that a wall of the B-pillar is disposed between the anchor body and the clamp member.

2. The mounting anchor of claim 1, wherein the anchor further comprises an opening extending through a thickness of the anchor, the opening sized to allow the clamp member to pass through the opening.

3. The mounting anchor of claim 1, wherein the clamp member comprises an L-shaped bracket including a bendable guide member.

4. The mounting anchor of claim 1, wherein the one or more bosses comprise first, second, and third bosses arranged in a substantially triangular shape such that the first and second bosses are disposed on a first end portion of the anchor body and the third boss is disposed on a second end portion of the anchor body.

5. The mounting anchor of claim 1, wherein the anchor body comprises a central depression extending along a length of the mounting anchor.

6. The mounting anchor of claim 1, wherein the anchor body comprises one or more flanges configured to extend around edge portions of the B-pillar.

7. A mounting assembly, comprising:
a mounting anchor comprising:
- an anchor body having a first end portion, a second end portion, a central opening, and one or more bosses extending from a surface of the anchor body, each boss comprising an inner bore including a threaded portion, and
- first and second clamp members, each clamp member comprising a body portion and a bendable guide member extending from the body portion;

wherein the anchor body is configured to be disposed on a first surface of a B-pillar of a vehicle; and wherein each clamp member is configured to be disposed on a second, opposing surface of the B-pillar and coupled to the anchor body such that a wall of the B-pillar is disposed between the anchor body and the respective clamp member.

8. The mounting assembly of claim 7, wherein the mounting anchor is a first mounting anchor configured to couple a first B-pillar, and wherein the mounting assembly further comprises a second mounting anchor configured to couple a second B-pillar of the vehicle.

9. The mounting assembly of claim 7, wherein the anchor body comprises a first aperture adjacent the first end portion and a second aperture adjacent the second end portion, and wherein the first and second clamp members each comprise a central aperture configured to align with the first and second apertures of the anchor body, respectively.

10. The mounting assembly of claim 7, further comprising a mounting bracket comprising one or more openings disposed such that they align with the one or more bosses of the anchor body.

11. The mounting assembly of claim 7, wherein the one or more bosses comprise first, second, and third bosses arranged in a substantially triangular shape such that the first and second bosses are disposed on a first end portion of the anchor body and the third boss is disposed on a second end portion of the anchor body.

12. The mounting assembly of claim 7, wherein the anchor body comprises a central depression extending along a length of the anchor body.

* * * * *